(12) United States Patent
Yamada et al.

(10) Patent No.: US 8,498,435 B2
(45) Date of Patent: Jul. 30, 2013

(54) SIGNAL PROCESSING APPARATUS AND SIGNAL PROCESSING METHOD

(75) Inventors: Maki Yamada, Kanagawa (JP); Mitsuru Endo, Tokyo (JP); Koichiro Mizushima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 50 days.

(21) Appl. No.: 13/262,690

(22) PCT Filed: Jan. 24, 2011

(86) PCT No.: PCT/JP2011/000358
§ 371 (c)(1),
(2), (4) Date: Oct. 3, 2011

(87) PCT Pub. No.: WO2011/105003
PCT Pub. Date: Sep. 1, 2011

(65) Prior Publication Data
US 2012/0020505 A1 Jan. 26, 2012

(30) Foreign Application Priority Data
Feb. 25, 2010 (JP) .................................. 2010-039698

(51) Int. Cl.
*H04R 25/00* (2006.01)
(52) U.S. Cl.
USPC .......................................... 381/313; 381/312
(58) Field of Classification Search
USPC ................... 381/312–313, 316–320
See application file for complete search history.

(56) References Cited

U.S. PATENT DOCUMENTS
2002/0009203 A1 1/2002 Erten

FOREIGN PATENT DOCUMENTS

| JP | 1-93298 | 4/1989 |
|---|---|---|
| JP | 2001-45454 | 2/2001 |
| JP | 2002-6874 | 1/2002 |
| JP | 2003-530051 | 10/2003 |
| JP | 2004-133403 | 4/2004 |
| JP | 2004-243023 | 9/2004 |
| JP | 2005-37953 | 2/2005 |
| JP | 2005-202035 | 7/2005 |
| WO | 2009/104332 | 8/2009 |

OTHER PUBLICATIONS

Ito et al., "Smile and Laughter Recognition using Speech Processing and Face Recognition from Conversation Video", IPSJ SIG Technical Report, May 26, 2005, pp. 41-46, 2005-NL-167, 2005-SLP-56.
International Search Report, mailed Apr. 12, 2011, for corresponding International Application No. PCT/JP2001/000358.

*Primary Examiner* — Suhan Ni
(74) *Attorney, Agent, or Firm* — Greenblum & Bernstein, P.L.C.

(57) ABSTRACT

A signal processing apparatus and signal processing method capable of correctly detecting that a conversation is established even in a daily environment are provided. In signal processing apparatus (100), excitation separation section (130) separates a mixed sound signal in which a plurality of excitations are mixed into the respective excitations. Speech detection section (140) performs speech detection on the plurality of separated excitation signals, judges whether or not the plurality of excitation signals are speech and generates speech section information indicating speech/non-speech information for each excitation signal. Identification parameter extraction section (150) extracts an identification parameter indicating a feature value of a daily conversation based on a plurality of excitation signals or speech section information. Conversation establishment degree calculation section (160) calculates and outputs a degree of establishment of a conversation based on the extracted identification parameter. Conversation partner identifying section (170) judges which excitation is a conversation partner using the degree of establishment of a conversation.

10 Claims, 18 Drawing Sheets

|  | TARGET SPEECH SIGNAL | |
|---|---|---|
|  | VOICE | SILENCE |
| RECEIVED SIGNAL — VOICE | POINT DEDUCTION | POINTS ADDITION |
| RECEIVED SIGNAL — SILENCE | POINTS ADDITION | POINT DEDUCTION |

FIG.1

USER'S UTTERANCE ↔ VOICE OF CONVERSATION PARTNER

|  | UTTERANCE | LAUGHTER | SILENCE |
|---|---|---|---|
| UTTERANCE | 98.32 | 4.68 | 187.84 |
| LAUGHTER | 6.84 | 6.17 | 10.98 |
| SILENCE | 221.59 | 10.03 | 58.66 |

FIG.10

USER'S UTTERANCE ↔ VOICE OF CONVERSATION PARTNER

|  | UTTERANCE | LAUGHTER | SILENCE |
|---|---|---|---|
| UTTERANCE | 162.90 | 9.72 | 109.23 |
| LAUGHTER | 8.84 | 0.52 | 12.47 |
| SILENCE | 163.92 | 7.93 | 129.59 |

FIG.11

CONVERSATION PARTNER/(CONVERSATION PARTNER + VOICE OF NON-CONVERSATION PARTNER)

|  | UTTERANCE | LAUGHTER | SILENCE |
|---|---|---|---|
| UTTERANCE | 37.64 | 32.50 | 62.23 |
| LAUGHTER | 43.62 | 92.28 | 46.83 |
| SILENCE | 57.48 | 55.85 | 31.16 |

FIG.12

| | | Sk | | |
|---|---|---|---|---|
| | | SPEECH | SPEECH | NON-SPEECH |
| | | NON-LAUGHTER | LAUGHTER | NON-LAUGHTER |
| | SPEECH DETECTION RESULT / LAUGHTER DETECTION RESULT | UTTERANCE | LAUGHTER | SILENCE |
| S1 SPEECH / NON-LAUGHTER | UTTERANCE | POINTS DEDUCTION:- $K_{11}$ (UTTERANCE OVERLAP) | POINTS DEDUCTION:- $K_{12}$ | POINTS ADDITION: + $K_{01}$ |
| SPEECH / LAUGHTER | LAUGHTER | POINTS DEDUCTION:- $K_{12}$ | POINTS ADDITION: + $K_{22}$ (SIMULTANEOUS LAUGHTER) | NOTHING DONE |
| NON-SPEECH / NON-LAUGHTER | SILENCE | POINTS ADDITION: + $K_{01}$ | NOTHING DONE | POINTS DEDUCTION: - $K_{00}$ (SILENCE) |

$0 \leq K_{12} \leq K_{11} \leq K_{22}$ $0 \leq K_{00} \leq K_{11}$

FIG.15

SIGNAL PROCESSING APPARATUS AND SIGNAL PROCESSING METHOD

TECHNICAL FIELD

The present invention relates to a signal processing apparatus and signal processing method for extracting a couple of people in conversation in an environment where there are voice of other people and noise in the neighborhood.

BACKGROUND ART

As a conventional signal processing apparatus that extracts a couple of people in conversation, there is an apparatus that extracts effective speech by judging the degree of establishment of a conversation based on a correlation between pieces of time sequence data of a speech signal through voice/silence evaluation (see patent literature 1).

The signal processing apparatus described in patent literature 1 uses a phenomenon that speech appears alternately between two excitations in an established conversation to perform voice/silence evaluation of the separated excitation signals and calculates the degree of establishment of a conversation according to a combination of voice/silence between the two excitations. FIG. 1 shows the concept of the method of calculating the degree of establishment of a conversation described in patent literature 1. When one of a target speech signal and a received signal is voice and the other is silence, points are added to the degree of establishment of a conversation, whereas when both signals are voice or silence, points are deducted. A conversation is assumed to be established for a combination of excitations having a large degree of establishment of a conversation.

CITATION LIST

Patent Literature

PTL 1
Japanese Patent Application Laid-Open No. 2004-133403
PTL 2
Japanese Patent Application Laid-Open No. 2002-6874
PTL 3
Japanese Patent Application Laid-Open No. 2004-243023
PTL 4
Japanese Patent Application Laid-Open No. 1-93298

Non-Patent Literature

NPL 1
"Smile and Laughter Recognition using Speech Processing and Face Recognition from Conversation Video" Akinori Ito et al, Tohoku University, 2005-NL-167, 2005-SLP-56, 2005/5/26

SUMMARY OF INVENTION

Technical Problem

However, in a daily informal conversation, utterances of speakers in the conversation do not temporally alternate on a regular basis. Here, the "daily informal conversation" refers not to a conversation conforming to a certain format such as a conference but to a conversation like a chat freely engaged by participants. When such a conversation becomes more informal, overlap of utterances (crosstalk) also tends to increase. Therefore, temporal overlap of voice increases in a daily conversation. For this reason, it is difficult to correctly distinguish a conversation partner from a non-conversation partner using the prior art that calculates the degree of establishment of a conversation through a combination of voice/silence alone.

Furthermore, a daily informal conversation is often accompanied by laughter. Laughter is a voice and the degree of establishment of a conversation decreases when laughter occurs simultaneously, and it is difficult to correctly distinguish a conversation partner from a non-conversation partner using the method of judging the presence of a voice based on power and calculating the degree of establishment of a conversation through a combination of voice/silence alone as in the case of the prior art.

Furthermore, in the prior art, if one speaker utters a voice and the other remains silent, points are added to the degree of establishment of a conversation, and therefore even when a person's voice continues unilaterally, it is assumed that a conversation is established. The conventional method may be used without problems when a conversation partner is found in a scene where a conversation is in progress at a meeting or the like. However, in a situation in which the user wears a wearable microphone such as a hearing aid all the time, it is often the case that the user talks to himself/herself or a third-party's voice continues to be inputted to the microphone, rendering the conventional method impractical.

As such, in a real daily environment, the conventional method that calculates the degree of establishment of a conversation through a combination of voice/silence alone has a problem that it is difficult to correctly detect that a conversation is established and lacks practicality.

It is therefore an object of the present invention to provide a signal processing apparatus and signal processing method capable of correctly detecting that a conversation is established also in a daily environment.

Solution to Problem

A signal processing apparatus of the present invention adopts a configuration including a separation section that separates a mixed sound signal in which a plurality of excitations are mixed into the respective excitations, a speech detection section that performs speech detection on the plurality of separated excitation signals, judges whether or not the plurality of excitation signals are speech and generates speech section information indicating speech/non-speech information for each excitation signal, at least one of an utterance overlap duration extraction section that calculates and analyzes an utterance overlap duration using the speech section information and a silence duration extraction section that calculates and analyzes a silence duration, and a conversation establishment degree calculation section that calculates a degree of establishment of a conversation indicating the degree of establishment of a conversation based on the extracted utterance overlap duration or the silence duration.

According to this configuration, it is possible to detect that a conversation is established also in a daily environment. It is possible to correctly judge the conversation partner also in an informal daily conversation by utilizing features of the daily conversation such as nodding while the other party is uttering, starting to utter before the other party completely finishes talking or producing a short silence.

The signal processing apparatus of the present invention is the above signal processing apparatus that adopts a configuration including, instead of the utterance overlap duration extraction section or the silence duration extraction section, a laughter detection section that performs laughter detection on the plurality of separated excitation signals and extracts laughter section information as the identification parameter, wherein the conversation establishment degree calculation section calculates the degree of establishment of a conversation using the speech section information and the laughter section information for combinations of the plurality of excitation signals.

By detecting laughter and evaluating the degree of establishment of a conversation focused on laughter overlap, this configuration makes it possible to correctly detect that a conversation is established also in an informal daily conversation.

The signal processing apparatus of the present invention is the above signal processing apparatus that adopts a configuration including, instead of the utterance overlap duration extraction section or the silence duration extraction section, an utterance ratio calculation section that extracts utterance ratio information as the identification parameter for combinations of the plurality of excitation signals, wherein the conversation establishment degree calculation section calculates the degree of establishment of a conversation using the speech section information and the utterance ratio information.

When the utterance section ratio between a user and the other party is extremely biased, this configuration reduces the degree of establishment of a conversation and thereby allows the signal processing apparatus to prevent malfunction. When applied, for example, to a device daily worn such as hearing aid, the signal processing apparatus will no longer malfunction due to soliloquy of the user or a third party's voice while the user is not in conversation.

A signal processing method of the present invention includes a separating step of separating a mixed sound signal in which a plurality of excitations are mixed into the respective excitations, a speech detection step of performing speech detection on the plurality of separated excitation signals, judging whether or not the plurality of excitation signals are speech and generating speech section information indicating speech/non-speech information for each excitation signal, at least one of a step of calculating and analyzing an utterance overlap duration using the speech section information for combinations of the plurality of excitation signals and a step of calculating and analyzing a silence duration and a calculating step of calculating a degree of establishment of a conversation indicating the degree of establishment of a conversation based on the extracted utterance overlap duration or the silence duration.

According to this method, it is possible to correctly detect that a conversation is established also in a daily environment.

Advantageous Effects of Invention

According to the present invention, it is possible to correctly detect that a conversation is established also in a daily environment, and thereby adjust or record speech of an established conversation to make the speech easier to hear.

BRIEF DESCRIPTION OF DRAWINGS

FIG. 1 is a diagram illustrating a concept of a method of calculating a degree of establishment of a conversation described in patent literature 1;

FIG. 10 is a diagram illustrating a total laughter/utterance/silence overlapping duration with respect to a conversation partner;

FIG. 11 is a diagram illustrating a total laughter/utterance/silence overlapping duration with respect to a non-conversation partner;

FIG. 12 is a diagram illustrating results of calculating a ratio of the conversation partner;

FIG. 15 is a diagram laughter/silence illustrating a method of calculating a degree of establishment of a conversation with a combination of utterance/laughter/silence;

DESCRIPTION OF EMBODIMENTS

Now, embodiments of the present invention will be described in detail with reference to the accompanying drawings.

Embodiment 1

In the present embodiment, a degree of establishment of a conversation is calculated with attention focused on an utterance overlap or silence duration. Before describing a specific configuration and operation of the present embodiment, the reason that the present inventor et al. focused attention on an utterance overlap or silence duration will be described first.

In a daily informal conversation, utterances of speakers in conversation do not temporally alternate on a regular basis. When a conversation is more informal, utterance overlap (crosstalk) also tends to increase. Therefore, since temporal overlap of voice increases in a daily conversation, the prior art that calculates a degree of establishment of a conversation only with a combination of voice/silence has a problem that it is difficult to correctly distinguish a conversation partner from a non-conversation partner. The present embodiment will solve the above problem.

In a daily conversation, it is often the case that before one speaker finishes talking, the other speaker starts to speak or while one speaker is talking, the other speaker nods. Therefore, the present inventor et al. focused attention on such an utterance overlap duration.

First, the present inventor et al. actually collected nine sets of daily conversations each lasting about ten minutes and analyzed durations of an utterance overlap with respect to the conversation partner and an utterance overlap with respect to the non-conversation partner about the data.

Figure 2:
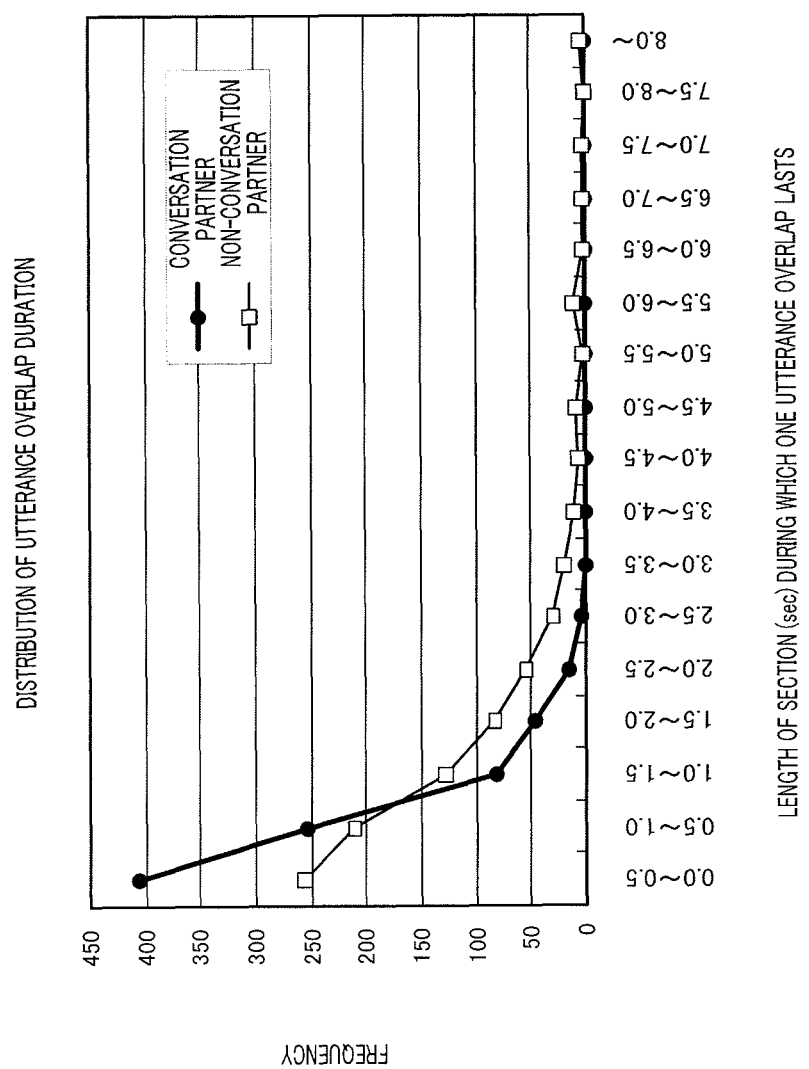
FIG. 2 is a diagram illustrating a distribution of utterance overlap durations of daily conversation data.

FIG. 2 is a graph illustrating a distribution of lengths (durations) of a section during which one utterance overlap continues with respect to the conversation partner and the non-conversation partner respectively. In FIG. 2, the horizontal axis shows the length of a section during which one utterance overlap continues and the vertical axis shows a frequency.

As a result, it has been proven that the length of a section during which one utterance overlap continues is often short for the conversation partner, while the length of a section during which one utterance overlap continues is often long for the non-conversation partner. Thus, the present embodiment will introduce parameters with attention focused not simply on whether an utterance overlap is long or short but on the length (duration) of a section during which one utterance overlap continues.

Furthermore, the present inventor et al. defined a state in which both speakers remained silent as silence and also analyzed the silence duration likewise.

Figure 3:
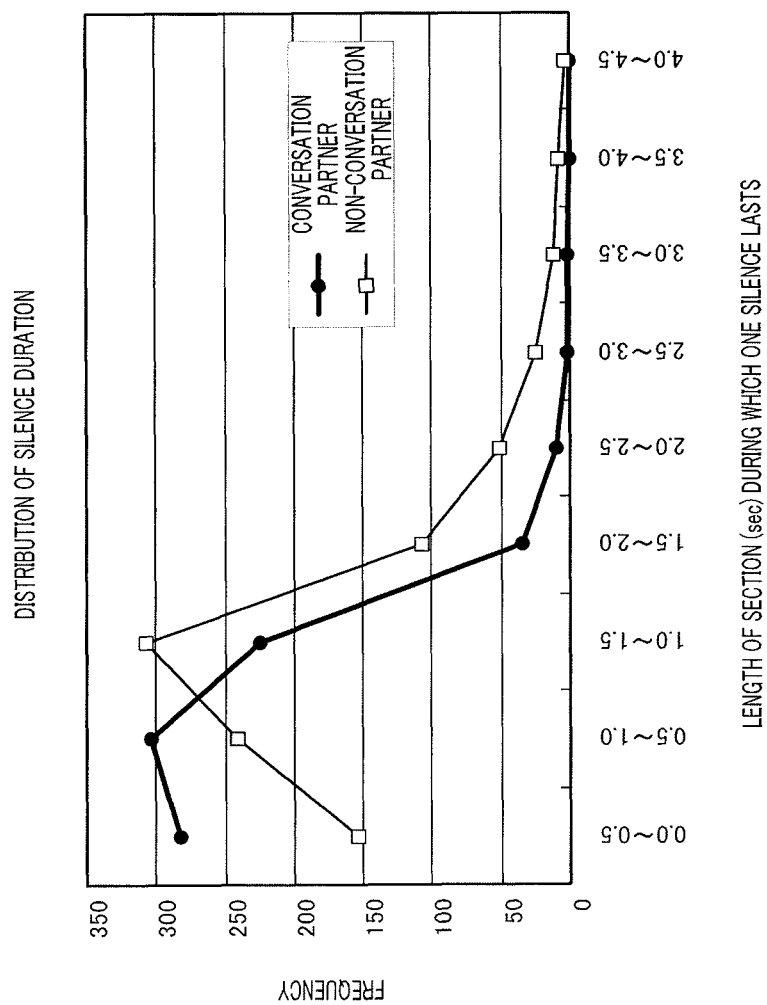
FIG. 3 is a diagram illustrating a distribution of silence durations of daily conversation data.

FIG. 3 is a graph illustrating a distribution of lengths (durations) of a section during which one silence continues for the conversation partner and non-conversation partner respectively. In FIG. 3, the horizontal axis shows the length of a section during which one silence continues and the vertical axis shows a frequency.

As a result, as in the case of utterance overlap, it has been proven also for silence that the duration of silence is often shorter for the conversation partner than for the non-conversation partner. Thus, as in the case of utterance overlap, the present embodiment introduces parameters with attention focused on the length (duration) of a section during which one silence continues.

The internal configuration of the signal processing apparatus according to the present embodiment will be described below.

Figure 4:
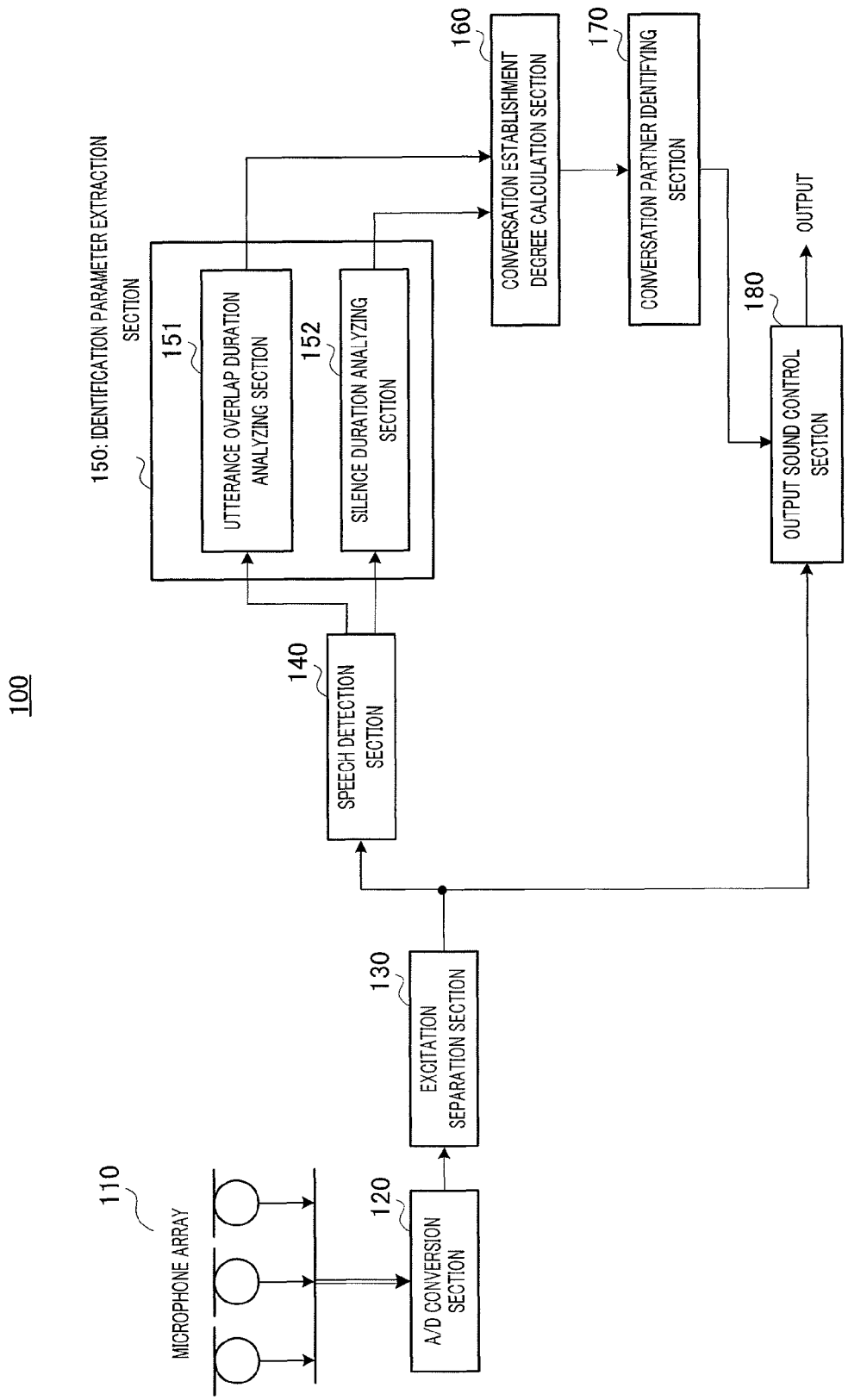
FIG. 4 is a block diagram showing main components of a signal processing apparatus according to Embodiment 1 of the present invention.

FIG. 4 is a block diagram showing main components of signal processing apparatus 100 according to the present embodiment.

Microphone array 110 is a sound recording apparatus in which a plurality of microphones are arranged.

A/D (Analog to Digital) conversion section 120 converts sound signals collected by the respective microphones to digital signals.

Excitation separation section 130 separates sound signals in which a plurality of excitations are mixed into their respective excitations by applying signal processing using a difference in the arrival time among sound signals arriving at their respective microphones.

Speech detection section 140 judges whether or not the sound signal separated by excitation separation section 130 is speech and generates speech section information indicating a speech/non-speech detection result for each excitation. The speech detection method by speech detection section 140 will be described later.

Identification parameter extraction section 150 extracts an identification parameter used to judge (identify) a conversation partner and calculate the degree of establishment of a conversation. Details of the identification parameter will be described later. In the present embodiment, identification parameter extraction section 150 includes utterance overlap duration analyzing section 151 and silence duration analyzing section 152.

Utterance overlap duration analyzing section 151 calculates and analyzes a duration of the utterance overlap section between excitations (hereinafter referred to as "utterance overlap duration analyzed value") using speech section information indicating the speech/non-speech detection result for each excitation judged by speech detection section 140.

Silence duration analyzing section 152 calculates and analyzes a duration of the silence section between excitations (hereinafter referred to as "silence duration analyzed value") using speech section information indicating the speech/non-speech detection result for each excitation judged by speech detection section 140.

By this means, identification parameter extraction section 150 extracts an utterance overlap duration analyzed value and a silence duration analyzed value as identification parameters indicating feature values of a daily conversation. The method of calculating the utterance overlap analyzed value and silence analyzed value in identification parameter extraction section 150 will be described later.

Conversation establishment degree calculation section 160 calculates a degree of establishment of a conversation based on the utterance overlap duration analyzed value calculated by utterance overlap duration analyzing section 151 and the silence duration analyzed value calculated by silence duration analyzing section 152. The method of calculating the degree of establishment of a conversation by conversation establishment degree calculation section 160 will be described later.

Conversation partner identifying section 170 judges which excitation is a conversation partner using the degree of establishment of a conversation calculated by conversation establishment degree calculation section 160.

Output sound control section 180 controls the output sound for the sound signal separated by excitation separation section 130 to make the voice of the conversation partner judged by conversation partner identifying section 170 easier to hear and outputs the output sound. To be more specific, output sound control section 180 performs directional control on the sound signal separated by excitation separation section 130 suppressing the direction of the excitation which is the non-conversation partner.

Figure 5:
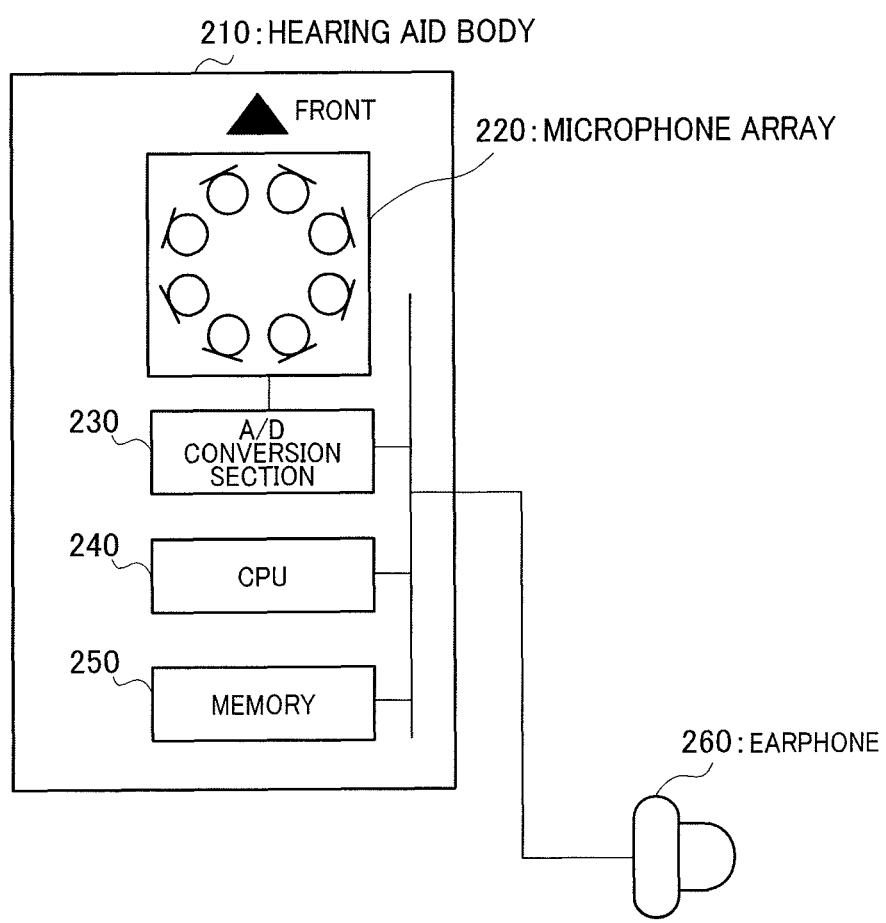
FIG. 5 is a diagram illustrating an example where the present invention is applied to a remote control type hearing aid provided with an earphone separated from the body.

FIG. 5 shows an example where signal processing apparatus 100 according to the present embodiment is applied to remote control type hearing aid (hereinafter abbreviated as "hearing aid") 200 provided with an earphone separated from the hearing aid body.

Hearing aid 200 is provided with hearing aid body 210 and earphone 260.

Hearing aid body 210 is made up of microphone array 220, A/D conversion section 230, CPU 240 and memory 250. Microphone array 220 includes eight microphones arranged in a circular shape. A/D conversion section 230 converts a sound signal collected by microphone array 220 to a digital signal. CPU 240 performs control and calculations on hearing aid body 210. Memory 250 stores data to be used for calculations.

Earphone 260 that outputs a sound signal is connected to hearing aid body 210. CPU 240 performs not only normal hearing aid processing such as amplification of a sound signal according to the user's auditory sense using memory 250 but also the above described excitation separation, speech detection, utterance overlap duration analysis, silence duration analysis, calculation of a degree of establishment of a conversation, conversation partner judgment and output sound control.

Hearing aid body 210 is normally placed on a desk, processes sound collected by microphone array 220 in hearing aid body 210 and allows the user wearing earphone 260 to hear the sound. The present embodiment will describe a case where the connection between hearing aid body 210 and earphone 260 is wired, but hearing aid body 210 and earphone 260 may be connected wirelessly.

Next, operations of hearing aid 200 configured as shown above will be described.

Figure 6:
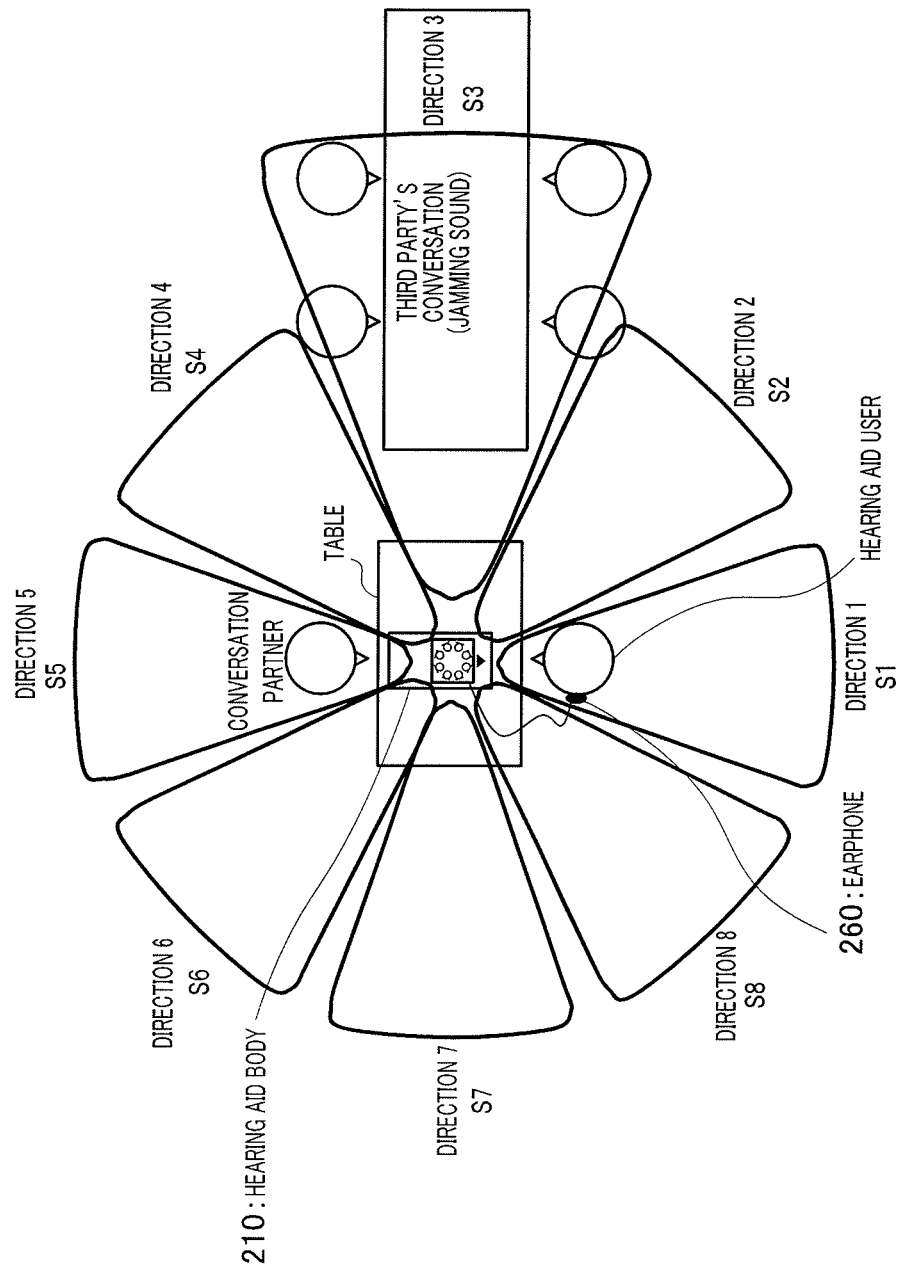
FIG. 6 is a diagram illustrating an example of positional relationship of people when a remote control type hearing aid is in actual use.

FIG. 6 is a diagram showing an example of positional relationship of people when hearing aid 200 in FIG. 5 is in actual use. In FIG. 6, the user of hearing aid 200 wears earphone 260. Hearing aid body 210 is placed on a table and the user is conversing with a conversation partner seated in the front of the user. Suppose hearing aid body 210 is placed on the table so that the user of hearing aid 200 is located in front of the body (direction marked ▲ in FIG. 5). In the example in FIG. 6, a conversation is being held by irrelevant speakers on the right side viewed from the user of hearing aid 200, producing a jamming sound.

Figure 7:
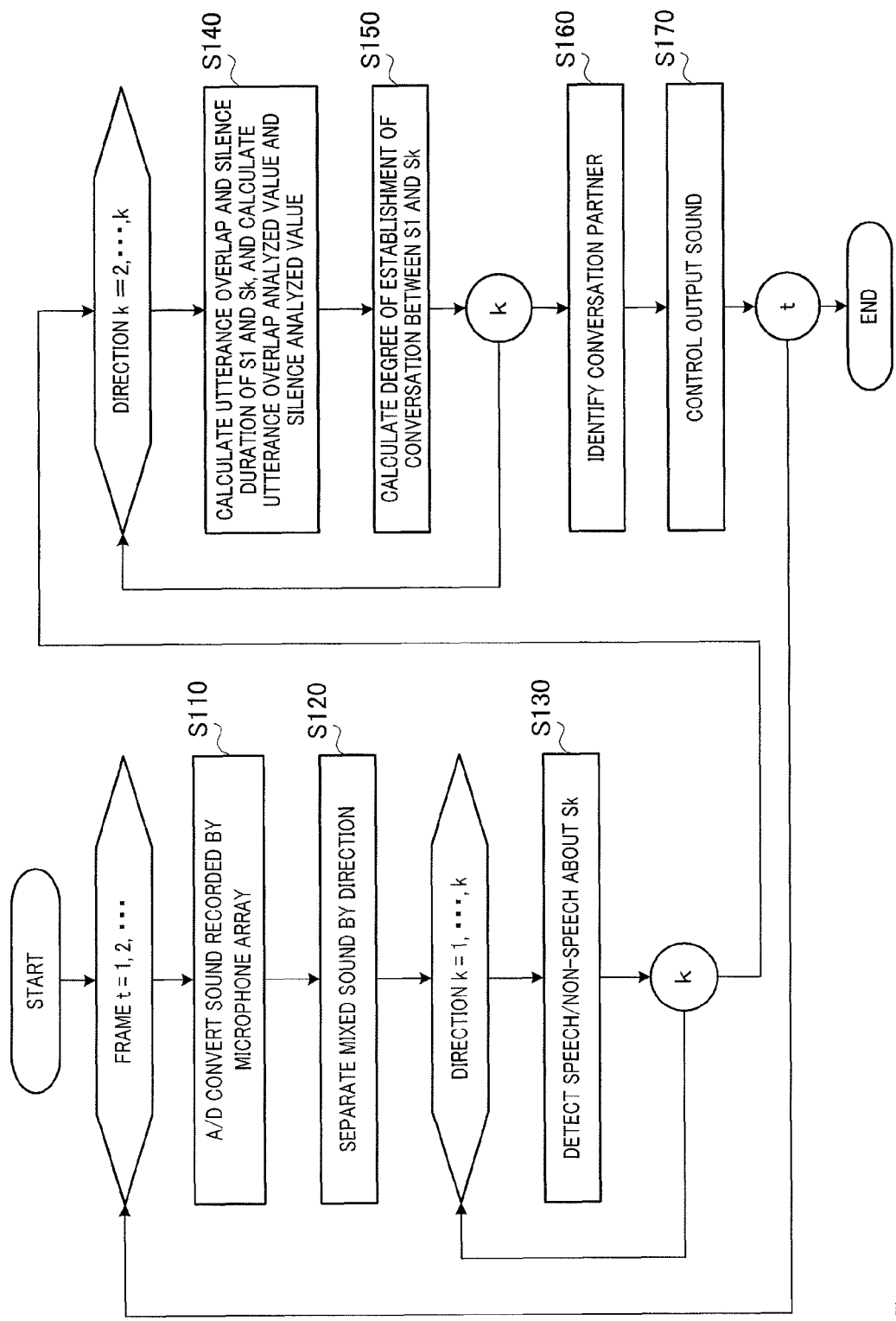
FIG. 7 is a flowchart illustrating operations of the hearing aid according to Embodiment 1.

FIG. 7 is a flowchart showing operations of hearing aid 200 mounted with signal processing apparatus 100 according to the present embodiment. Operations of hearing aid 200 will be described using the flowchart in FIG. 7. In the figure, reference character S denotes each step of the flow. The following processing in each step of FIG. 7 will be performed using CPU 240 and memory 250. In CPU 240 and memory 250, processing is advanced in short-time units (frame, assumed to be 10 msec here).

First, in step S110, A/D conversion section 120 converts a sound signal inputted from microphone array 110 (220) incorporated in hearing aid body 210 from analog to digital and outputs the digital signal to excitation separation section 130.

Next, in step S120, excitation separation section 130 separates the sound signal by direction in frame units using differences in the arrival time of the sound signals arriving at the respective microphones. Here, suppose excitation separation section 130 separates the sound signal into eight directions k (k=1, 2, . . . , 8) all sides by angle 45°.

Here, suppose these separated sound signals are S1, S2, S3, S4, S5, S6, S7 and S8 in that order counterclockwise from the front of hearing aid 200 where the user is located. Of these eight directions, the front of hearing aid 200 is the direction in which the user of hearing aid 200 is located, and therefore sound signal S1 arriving from this direction is assumed to be the user's voice.

Next, the processing in step S130 is performed on sound signals Sk (k: direction, k=1, 2, . . . , 8) in the eight separated directions respectively.

In step S130, speech detection section 140 performs speech/non-speech detection on sound signal Sk (k: direction, k=1, 2, . . . , 8). As the speech detection method, for example, power in a speech band (e.g. 200 Hz to 4000 Hz) is calculated in frame units, smoothed in the time direction and judged as speech when the power exceeds a threshold. In order to perform speech detection more accurately, it is preferable to perform post-processing of regarding a short-time speech section as silence and regarding continued speech accompanied by short-time silence as speech or the like.

The speech detection method is not limited to the method using power in a speech band, but other methods such as a method of detecting a harmonic structure, a method of making a comparison with a model may also be used.

Hereinafter, the section judged as speech by speech detection section 140 will be defined as an utterance section.

Next, processing in steps S140 and S150 will be performed on combinations of front sound signal S1 and sound signals S2 to S8 in seven directions other than the front direction.

In step S140, utterance overlap duration analyzing section 151 and silence duration analyzing section 152 calculate durations of an utterance overlap between sound signal S1 and sound signal Sk (k: direction, k=2, 3, . . . , 8) and a silence section. Utterance overlap duration analyzing section 151 and silence duration analyzing section 152 then calculate utterance overlap analyzed value Pc and silence analyzed value Ps in frame t and output these values to conversation establishment degree calculation section 160.

Figure 8:
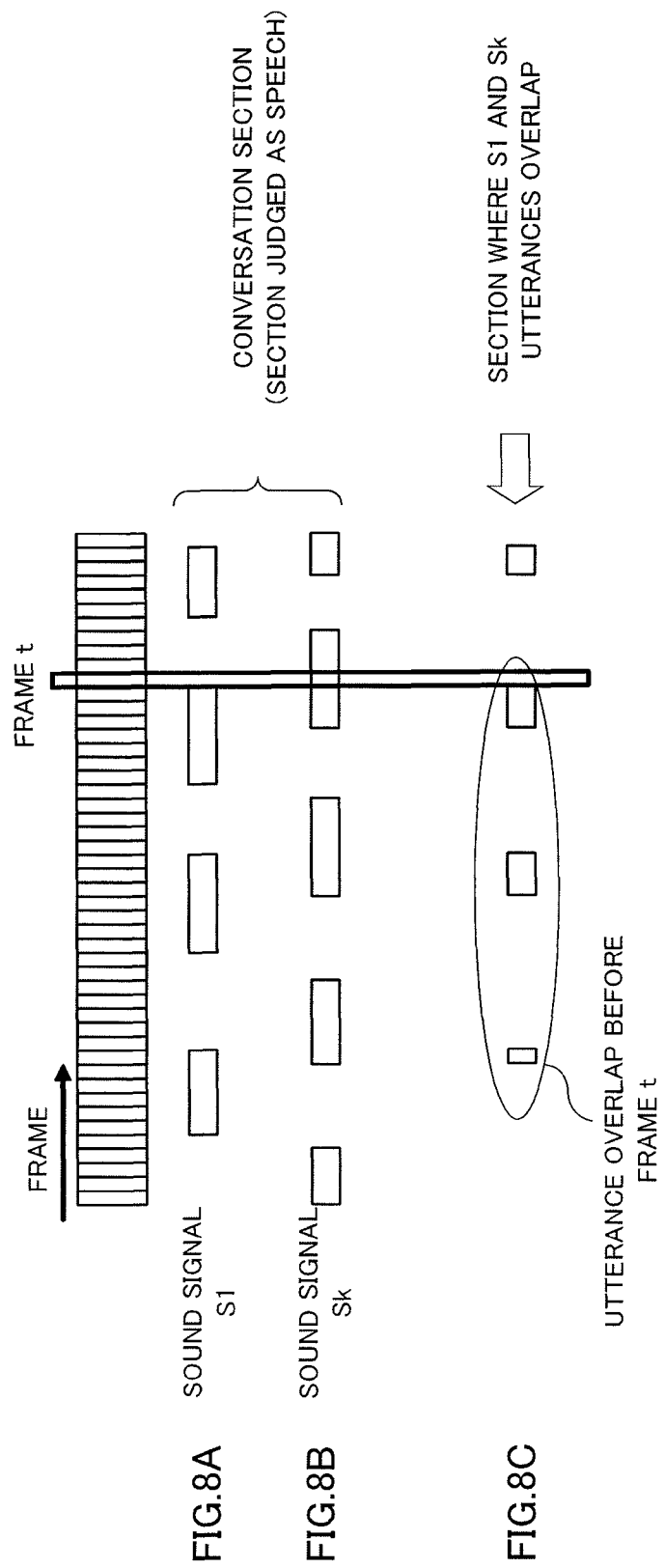
FIG. 8 is a diagram illustrating how to calculate utterance overlap analyzed value Pc.

Hereinafter, the method of calculating utterance overlap analyzed value Pc and silence analyzed value Ps will be described. First, the method of calculating utterance overlap analyzed value Pc will be described with reference to FIG. 8.

In FIG. 8A, sections shown by rectangles represent utterance sections in which sound signal S1 is judged as speech based on speech section information indicating a speech/non-speech detection result generated by speech detection section 140. In FIG. 8B, sections shown by rectangles represent utterance sections in which sound signal Sk is judged as speech. Utterance overlap duration analyzing section 151 then defines portions where these sections overlap as utterance overlaps (FIG. 8C).

Specific operations of utterance overlap duration analyzing section 151 are as follows. When the utterance overlap starts in frame t, utterance overlap duration analyzing section 151 stores the frame as a starting frame. When the utterance overlap ends in frame t, utterance overlap duration analyzing section 151 regards this as one utterance overlap and assumes the time length from the starting frame as the duration of the utterance overlap.

In FIG. 8C, the portion enclosed by the ellipse represents an utterance overlap before frame t. When the utterance overlap ends in frame t, utterance overlap duration analyzing section 151 calculates and stores statistics on the duration of the utterance overlap before frame t. Furthermore, utterance overlap duration analyzing section 151 calculates utterance overlap analyzed value Pc in frame t using the statistics. Utterance overlap analyzed value Pc is preferably a parameter indicating whether there are more cases where the duration is short or long.

Next, the method of calculating silence analyzed value Ps will be described.

First, silence duration analyzing section 152 defines a portion where a section of sound signal S1 judged as non-speech and a section of sound signal Sk judged as non-speech overlap with each other as silence based on the speech section information generated by speech detection section 140. As in the case of the analyzed degree of utterance overlap, silence duration analyzing section 152 calculates a duration of the silence section and stores statistics on the duration of the silence section before frame t. Furthermore, silence duration analyzing section 152 calculates silence analyzed value Ps in frame t using the statistics. Silence analyzed value Ps is also preferably a parameter indicating whether there are more cases where the duration is short or long.

A specific method of calculating utterance overlap analyzed value Pc and silence analyzed value Ps will be described below.

Silence duration analyzing section 152 stores and updates statistics on the duration in frame t. The statistics on the duration include (1) sum Wc of durations of utterance overlaps before frame t, (2) number of utterance overlaps Nc, (3) sum of silence durations Ws and (4) number of silence Ns. Utterance overlap duration analyzing section 151 and silence duration analyzing section 152 then calculate average duration Ac of the utterance overlap before frame t and average duration As of the silence section before frame t from equations 1-1 and 1-2 respectively.

$$Ac = \text{sum of durations of utterance overlap } Wc/\text{number of utterance overlaps } Nc \quad \text{(Equation 1-1)}$$

$$As = \text{sum of durations of silence section } Ws/\text{number of silence } Ns \quad \text{(Equation 1-2)}$$

When the values of Ac and As are smaller, Ac and As indicate that there are more short utterance overlaps and short silence respectively. Thus, to adjust the size relationship, the signs of Ac and As are inverted and utterance overlap analyzed value Pc and silence analyzed value Ps are defined as equations 2-1 and 2-2 below.

$$Pc = -Ac \quad \text{(Equation 2-1)}$$

$$Ps = -As \quad \text{(Equation 2-2)}$$

In addition to utterance overlap analyzed value Pc and silence analyzed value Ps, the following parameters may also be considered as the parameters indicating whether there are more conversations of short duration or more conversations of long duration.

When the parameters are calculated, conversations are classified into conversations whose utterance overlap and silence duration are shorter than threshold T (e.g. T=1 second) and conversations whose utterance overlap and silence duration are equal to or longer than T, and the number of the conversations or silence, or the sum of the respective durations is calculated. Next, when parameters are calculated, the number of conversations of short duration appearing before frame t or the ratio with respect to the sum of durations is calculated. When the value this ratio is larger, the ratio becomes a parameter indicating that there are more conversations of short duration.

These statistics are initialized when a silence lasts for a predetermined time so as to represent the nature of one chunk of conversation. Alternatively, the statistics may also be initialized every predetermined time (e.g. 20 seconds). Furthermore, statistics of utterance overlap or silence duration within a certain past time window may always be used as the statistics.

Furthermore, to reduce the amount of calculation, it may be judged that there are no people in an excitation direction in which no speech has been detected for a certain time so that the above processing is not performed until the next speech is detected.

Returning to FIG. 7 again, in step S150, conversation establishment degree calculation section 160 calculates the degree of establishment of a conversation between sound signal S1 and sound signal Sk and outputs the degree of establishment of a conversation to conversation partner identifying section 170.

Degree of establishment of a conversation $C_{1,k}(t)$ in frame t is defined, for example, as shown in equation 3.

(Equation 3)

$$C_{1,k}(t) = w1 \cdot Pc(t) + w2 \cdot Ps(t) \quad [3]$$

For weight w1 of utterance overlap analyzed value Pc and weight w2 of silence analyzed value Ps, optimal values are obtained beforehand through experiments.

Frame t is initialized at a point in time at which silence has lasted for a certain time for excitations in all directions. Conversation establishment degree calculation section 160 then starts counting when power is found in an excitation in any one direction. The degree of establishment of a conversation may also be calculated using a time constant that allows data in a distant past to be obliterated and adapted to the latest situation.

When degrees of establishment of a conversation $C_{1,k}(t)$ (k: direction, k=2, 3, . . . , 8) in seven directions are obtained, in next step S160, conversation partner identifying section 170 judges which excitation in which direction corresponds to the user's conversation partner. Conversation partner identifying section 170 then outputs the judgment result to output sound control section 180. As the method of judging the conversation partner, an excitation in a direction exceeding threshold θ and having a maximum value from $C_{1,k}(t)$ of all directions is determined as the conversation partner.

Furthermore, the following variations can be considered as other judgment methods of judging the conversation partner.

All excitations in directions exceeding threshold θ from C1,k(t) of all directions are assumed to correspond to the conversation partner.

Instead of all directions, only those in the front direction (S3 to S7 or the like) are assumed to be search targets.

When a conversation partner was judged immediately before, only those in that direction and neighboring directions are assumed to be search targets (since the speaker does not move temporally rapidly).

Finally in step S170, output sound control section 180 controls directionality toward the direction judged as the direction of the conversation partner, thereby processes the inputted mixed sound so as to make it easier to hear and outputs the mixed sound from earphone 260.

A case has been described above where identification parameter extraction section 150 includes utterance overlap duration analyzing section 151 and silence duration analyzing section 152. The present embodiment may also be adapted so as to include only one of utterance overlap duration analyzing section 151 and silence duration analyzing section 152. Such a case is equivalent to a case where one of weight w1 of utterance overlap analyzed value Pc and weight w2 of silence analyzed value Ps in equation 3 is set to 0.

As described above, the present embodiment adopts a configuration in which identification parameter extraction section 150 includes at least one of utterance overlap duration analyzing section 151 and silence duration analyzing section 152. Utterance overlap duration analyzing section 151 calculates and analyzes the utterance overlap duration using speech section information and silence duration analyzing section 152 calculates and analyzes the silence duration. Conversation establishment degree calculation section 160 calculates the degree of establishment of a conversation using at least one of the utterance overlap duration and silence duration. By this means, the present embodiment can utilize features of daily conversations such that the utterance overlap caused by nodding is short, the utterance overlap when an utterance starts before the partner completely finishes talking is short or a silence in a conversation is short. Thus, the present embodiment can correctly calculate the degree of establishment of a conversation even in an informal daily conversation, and thereby correctly detect that the conversation is established and correctly judge the conversation partner.

The present inventor et al. actually conducted a simulation experiment to detect the conversation partner using speech data recording five sets of daily conversations.

In the simulation experiment, five sets of two-minute daily conversations are recorded using the microphone array and humming multitalker noise separately recorded in a dining room is superimposed on the recorded speech data so that SN ratios of 5, 10, 15 and 20 dB are obtained. Next, in the simulation experiment, speech detection is performed on each speaker using speech power for the respective SN ratios. In the simulation experiment, five combinations of conversation partners and 40 combinations of non-conversation partners are created in a simulated manner for the speech detection results of the respective speakers and the percentage of correct answers about the conversation partner is determined for the conventional method and the method of the present invention.

Here, the conventional method is the method disclosed in patent literature 1 and the degree of establishment of a conversation is updated using a time constant. The conventional method calculates degree of establishment of a conversation $C_{1,k}(t)$ in frame t using equation 4. Here, in frame t, as for sound signal Sk, it is assumed that $V_k(t)=1$ in the case of speech and $V_k(t)=0$ in the case of non-speech.

$$C_{1,k}(t)=\epsilon \cdot C_{1,k}(t-1)+(1-\epsilon)\lfloor R_{1,k}(t)+T_{1,k}(t)+(1-D_{1,k}(t))+(1-S_{1,k}(t))\rfloor$$ (Equation 4-1)

$$D_{1,k}(t)=\alpha \cdot D_{1,k}(t-1)+(1-\alpha) \cdot V_1(t) \cdot V_k(t)$$ (Equation 4-2)

$$R_{1,k}(t)=\beta \cdot R_{1,k}(t-1)+(1-\beta) \cdot (1-V_1(t)) \cdot V_k(t)$$ (Equation 4-2)

$$T_{1,k}(t)=\gamma \cdot T_{1,k}(t-1)+(1-\gamma) \cdot V_1(t) \cdot (1-V_k(t))$$ (Equation 4-2)

$$S_{1,k}(t)=\delta \cdot S_{1,k}(t-1)+(1-\delta) \cdot (1-V_1(t)) \cdot (1-V_k(t))$$ (Equation 4-2)

where time constant $\alpha=\beta=\equiv=0.99999$, $\partial=0.99995$, and $\epsilon=0.999$.

Furthermore, the present invention adopts the method using an utterance overlap analysis and silence analysis, calculates an utterance overlap analyzed value and silence analyzed value for each frame and updates a degree of establishment of a conversation. Furthermore, degree of establishment of a conversation $C_{1,k}(t)$ in frame t is calculated using equation 3.

Figure 9:
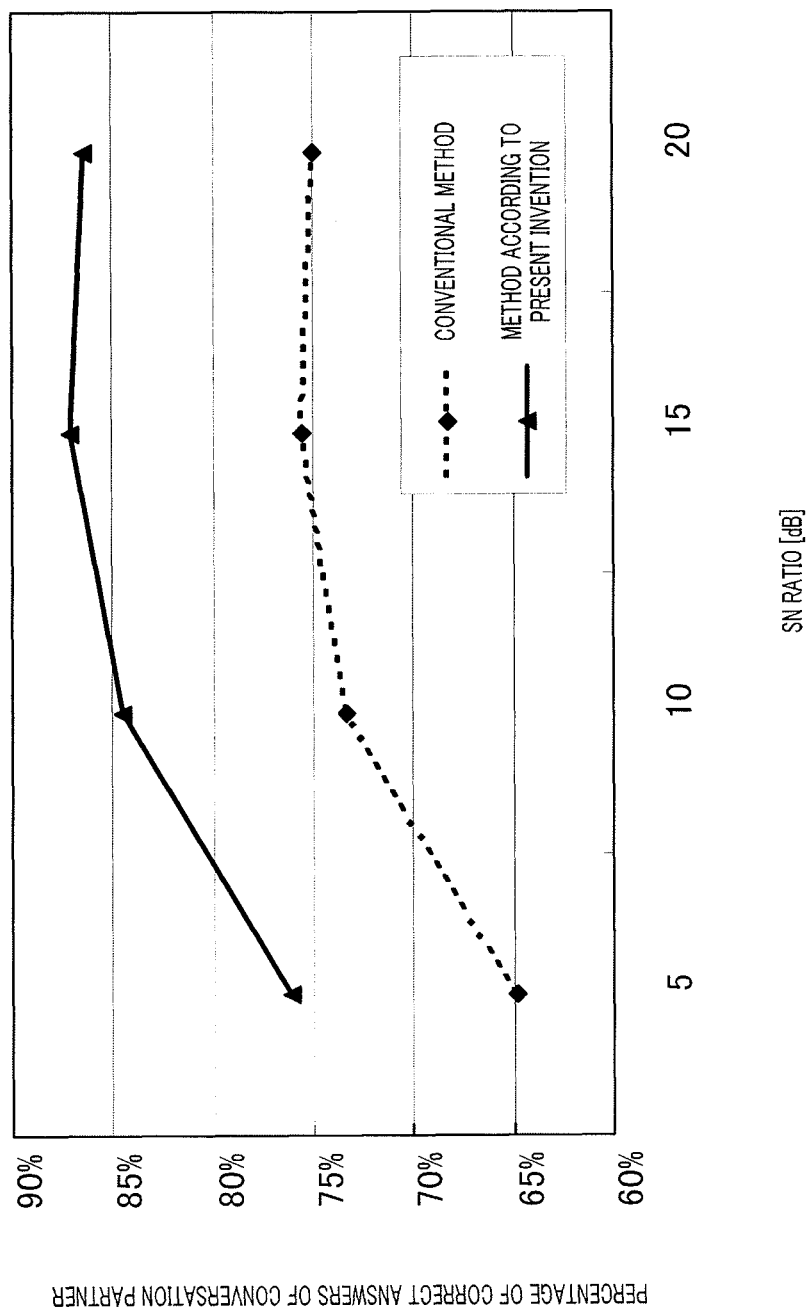
FIG. 9 is a diagram illustrating a conversation partner detection ratio by a simulation experiment according to Embodiment 1.

Here, the evaluation method assumes a case with $C_{1,k}(t)$ exceeding threshold θ to be a correct answer in the case of the set of conversation partners and assumes a case with $C_{1,k}(t)$ falling below threshold θ to be a correct answer in the case of the set of non-conversation partners. Furthermore, the percentage of correct answers about the conversation partner is defined as an average value of the ratio of correctly detecting the conversation partner and the ratio of correctly discarding the non-conversation partner. FIG. 9 shows the percentage of correct answers about the conversation partner according to the conventional method and the method according to the present invention.

As is obvious from FIG. 9, the method according to the present invention, which calculates the degree of establishment of a conversation using analyzed values of the average durations of utterance overlap and silence, obtains significantly high conversation partner detection performance in all SN ratio levels compared to the conventional method. This has confirmed the effectiveness of the present invention.

A case has been described above where excitation separation section 130 separates a sound signal by direction. Excitation separation section 130 may also separate a sound signal using other excitation separation methods such as independent component analysis (ICA). Furthermore, excitation separation section 130 may only calculate the magnitude of power per band by direction, perform speech detection from the power by direction and perform similar operation.

Furthermore, the present embodiment may provide a speaker identification section that identifies a speaker so that when a plurality of speakers are present in the same direction, the speakers are separated into the respective speakers.

Embodiment 2

The present embodiment will calculate a degree of establishment of a conversation with attention focused on a laughter overlap. Before describing a specific configuration and operation of the present embodiment, the reason that the present inventor et al. have focused attention on a laughter overlap will be described first.

Daily informal conversations are often accompanied by laughter. Laughter is voice. Therefore, the method according to the prior art of calculating the degree of establishment of a conversation by making voice judgment according to power and through a combination of voice/silence results in a reduced degree of establishment of a conversation when laughter occurs simultaneously. For this reason, the conventional method has a problem that it is difficult to correctly distinguish a conversation partner from a non-conversation partner. The present embodiment will solve such a problem.

The present inventor et al. investigated from nine sets of conversation data recording daily conversations to determine to what extent laughter/utterance/silence (a silent section which is neither utterance nor laughter) have temporally overlapped in order to analyze about timing of appearance of laughter from actual daily conversations. The conversation data is recorded for each speaker and labels of utterance sections of laughter/utterance/silence are assigned through audition.

FIG. 10 shows a total utterance/laughter/silence overlapping duration (msec) for a conversation partner and FIG. 11 shows a total utterance/laughter/silence overlapping duration (msec) for a non-conversation partner. It is clear from a comparison between utterance/laughter/silence that more laughter overlaps occur for the conversation partner than the non-conversation partner.

Based on such data, FIG. 12 shows a result of calculating a ratio at which both speakers are conversation partners in a combination of utterance/laughter/silence overlaps. It is clear from FIG. 12 that when laughter overlaps, the ratio at which both speakers are conversation partners is as high as 92.28%, which is significantly high compared to the ratio at which the overlap between utterance and silence corresponds to the conversation partner (62.23%, 57.48%). Therefore, the laughter overlap represents a feature value of daily conversation and can be said to be an important parameter in judging the conversation partner. Thus, the present embodiment is designed to calculate a degree of establishment of a conversation by focusing attention on the laughter overlap in addition to a simple combination of voice/silence.

When, for example, laughter overlaps, a method of adding points to the degree of establishment of a conversation or the like is used as the method of evaluating the degree of establishment of a conversation. Weights in point addition are made to be equal or greater than when one speaker is talking and the other speaker remains silent.

Furthermore, it is clear from FIG. 12 that when one speaker is laughing and the other speaker is talking, the ratio at which both speakers are conversation partners is as slightly low as around 40%. On the other hand, when one speaker is laughing and the other speaker remains silent, it is clear that the ratio at which both speakers are conversation partners is around 50%, which does not contribute to identification of the degree of establishment of a conversation. From above, when one speaker is laughing and the other speaker is talking or remains silent, only fewer points may be deducted or neither addition nor deduction of points may be made. Thus, by performing evaluation with attention focused on a laughter overlap, it is possible to correctly calculate the degree of establishment of a conversation.

Hereinafter, an internal configuration of the signal processing apparatus according to the present embodiment will be described. As in the case of Embodiment 1, the present embodiment is an example where the present invention is applied to a remote control type hearing aid. Since the shape of the remote control type hearing aid is similar to that in FIG. 5, descriptions thereof will be omitted.

Figure 13:
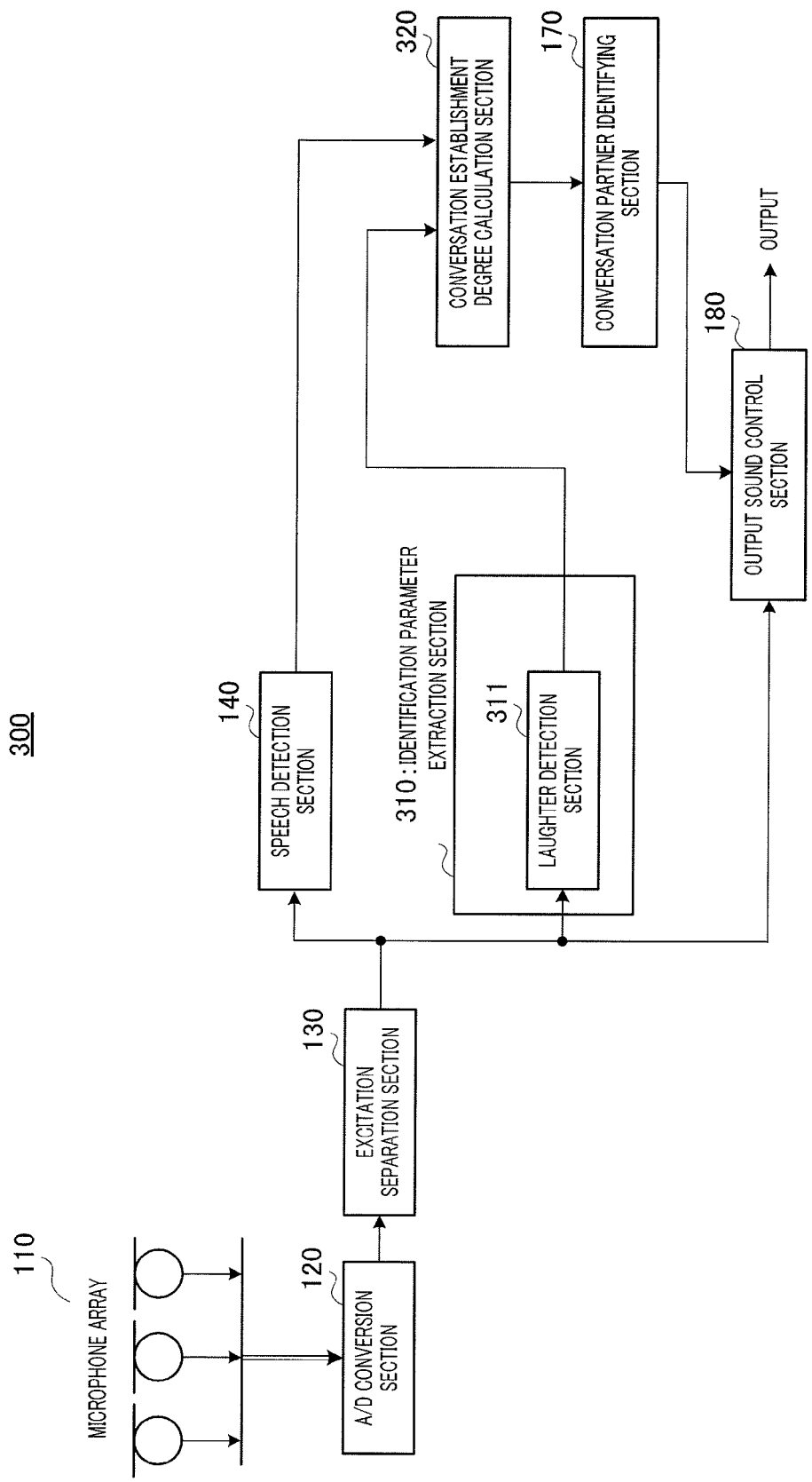
FIG. 13 is a block diagram illustrating main components of a signal processing apparatus according to Embodiment 2 of the present invention.

FIG. 13 is a block diagram showing main components of signal processing apparatus 300 according to the present embodiment. In signal processing apparatus 300 in FIG. 13, components common to those of signal processing apparatus 100 in FIG. 4 will be assigned the same reference numerals as those in FIG. 4 and descriptions thereof will be omitted. Signal processing apparatus 300 in FIG. 13 is provided with identification parameter extraction section 310 and conversation establishment degree calculation section 320 instead of identification parameter extraction section 150 and conversation establishment degree calculation section 160 provided for signal processing apparatus 100 in FIG. 4.

Identification parameter extraction section 310 includes laughter detection section 311.

Laughter detection section 311 judges whether or not a sound signal separated by excitation separation section 130 is a laughing voice. A publicly known technique is used for the method of detecting laughter from a sound signal. Examples of the publicly known technique include the following conventional methods.

For example, PL 2 judges a section where speech power exceeds a predetermined threshold as a speech section and calculates an rms amplitude value in frame units. Next, PL 2 discloses a method that extracts a section where the average value exceeds a predetermined threshold and judges, through speech recognition, a section where the same vowel continues intermittently such as "ha-ha" or "ha-ha-ha" as a laughing voice section.

Furthermore, PL 3 discloses a method that calculates an envelope of a frequency band signal of a vowel and judges, when an amplitude peak of the envelope is equal to or greater than a predetermined value, whether or not the cycle of the amplitude peak falls within a predetermined range.

Furthermore, non-patent literature 1 discloses a method of modeling a laughing voice using a GMM (Gaussian Mixture Model) and identifying a laughing voice and non-laughing voice in frame units.

Hereinafter, a case will be described as in the case of NPL 1 where a method of comparing a laughter GMM learned beforehand and a non-laughter GMM is used as a laughter detection method.

Conversation establishment degree calculation section 320 calculates a degree of establishment of a conversation using laughter section information obtained by laughter detection section 311 and speech section information obtained by speech detection section 140. The method of calculating the degree of establishment of a conversation by conversation establishment degree calculation section 320 will be described later.

Figure 14:
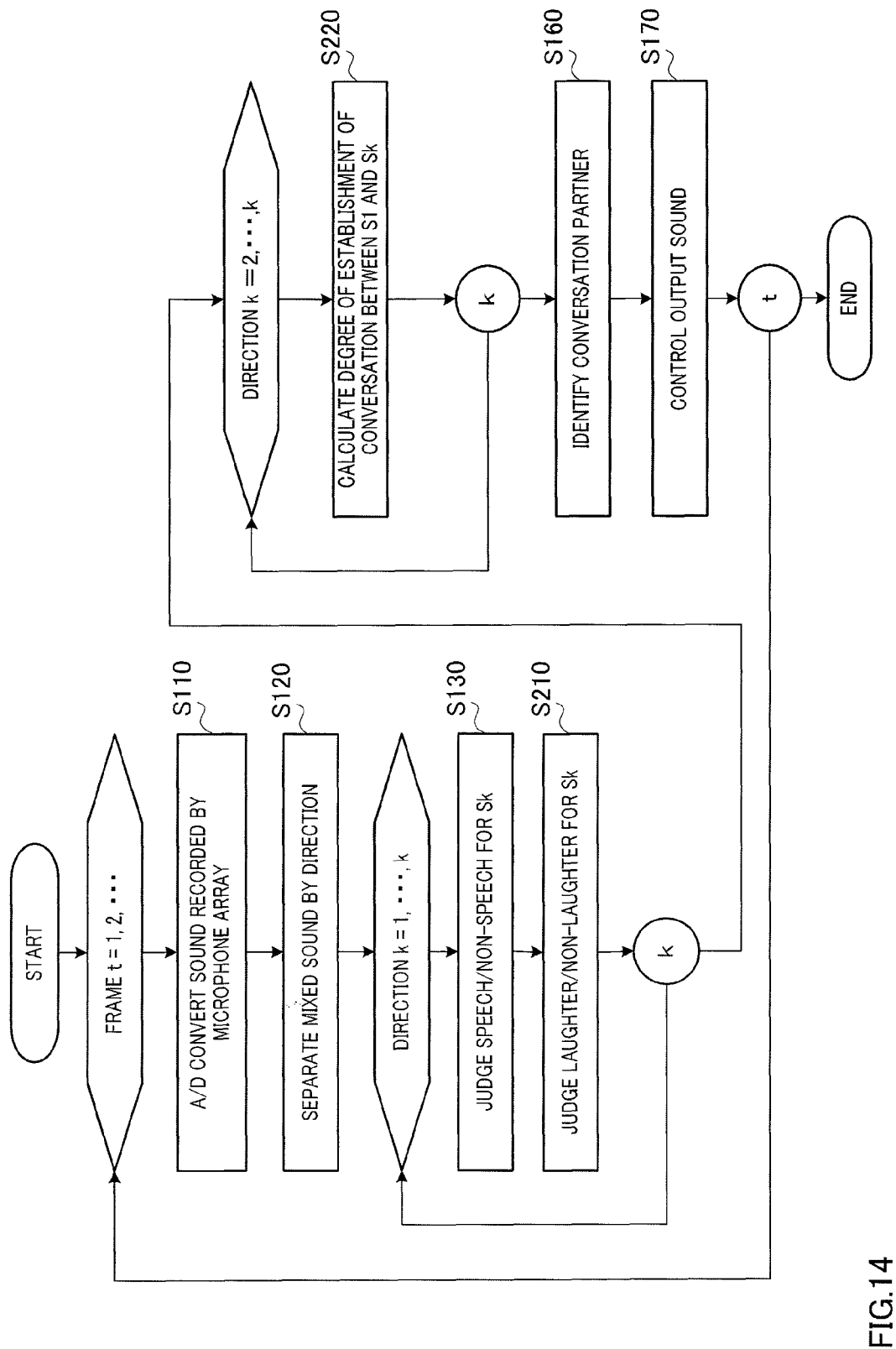
FIG. 14 is a flowchart illustrating operations of a hearing aid according to Embodiment 2.

FIG. 14 is a flowchart showing operations of hearing aid 200 mounted with signal processing apparatus 300 according to the present embodiment. Operations of hearing aid 200 will be described using the flowchart in FIG. 14. In FIG. 14, steps common to those in FIG. 7 will be assigned the same reference numerals as those in FIG. 7 and descriptions thereof will be omitted.

In steps S110, S120 and S130, sound recording and A/D conversion, separation and speech detection will be performed respectively as in the case of Embodiment 1.

Next to step S130, that is, in step S210, laughter detection section 311 makes a laughter/non-laughter judgment about sound signal Sk. First, in frame t, laughter detection section 311 compares a feature parameter vector of frame t with a laughter GMM and non-laughter GMM learnt beforehand and determines a laughter likelihood and non-laughter likelihood. The feature parameter vector is assumed to be a vector made up of a total of 25 dimensions of MFCC twelve dimensions ($C_1$ to $C_{12}$) obtained by applying an acoustic analysis to each frame, first-order feedback coefficient twelve dimensions ($\Delta C_1$ to $\Delta C_{12}$) thereof and first-order feedback coefficient one dimension ($\Delta E$) of logarithmic power. MFCC stands for Mel Filter Cepstral Coefficient. Laughter detection section 311 accumulates laughter likelihoods and non-laughter likelihoods corresponding to past N frames (e.g. N=50) and assumes the likelihoods having a larger accumulation result as the judgment result. Laughter detection section 311 accumulates and judges likelihoods corresponding to N frames and thereby improves identification performance.

In step S220, conversation establishment degree calculation section 320 calculates a degree of establishment of a conversation between sound signal S1 and sound signal Sk for a combination of front sound signal S1 and sound signal Sk (k: direction, k=2, 3, . . . , 8) in seven directions other than the front direction.

FIG. 15 is a table showing the concept of the method of calculating a degree of establishment of a conversation using a combination of utterance/laughter/silence. S1 denotes a sound signal in direction 1 in which the user's voice is present and Sk denotes a sound signal in direction k (k=2, 3, . . . , 8).

Here, "utterance," "silence" and "laughter" are defined as follows.

"Utterance": a frame whose speech detection result is speech and whose laughter detection result is non-laughter.

"Silence": a frame whose speech detection result is non-speech and whose laughter detection result is non-laughter.

"Laughter": a frame whose laughter detection result is laughter regardless of the speech detection result.

In the present embodiment, conversation establishment degree calculation section 320 calculates degree of establishment of a conversation $C_{1,k}(t)$ in frame t using, for example, equation 5.

(Equation 5)

$$C_{1,k}(t) = SC_{1,k}(t)/t \quad [5]$$
when $t = 0$
$$SC_{1,k}(t) = 0$$
when $t > 0$
$$SC_{1,k}(t) = SC_{1,k}(t-1) - K_{11}$$
(when S1 is utterance and Sk is utternace in frame $t$) =
$$SC_{1,k}(t-1) - K_{12}$$
(when S1 is utterance and Sk is laughter in frame $t$) =
$$SC_{1,k}(t-1) + K_{01}$$
(when S1 is utterance and Sk is silence in frame $t$) =
$$SC_{1,k}(t-1) - K_{12}$$
(when S1 is laughter and Sk is utternace in frame $t$) =
$$SC_{1,k}(t-1) + K_{22}$$
(when S1 is laughter and Sk is laughter in frame $t$) = $SC_{1,k}(t-1)$
(when S1 is laughter and Sk is silence in frame $t$) =
$$SC_{1,k}(t-1) + K_{01}$$
(when S1 is silence and Sk is utternace in frame $t$) = $SC_{1,k}(t-1)$
(when S1 is silence and Sk is laughter in frame $t$) =
$$SC_{1,k}(t-1) - K_{10}$$
(when S1 is silence and Sk is silence in frame $t$)
where, it is assumed that $0 \leq K_{12} \leq K_{11} \leq K_{22}, 0 \leq K_{00}$ Frame t is initialized at a point in time at which a silence lasts for a predetermined time for excitations in all directions. Furthermore, the degree of establishment of a conversation may also be calculated using a time constant that allows distant past data to be obliterated and adapted to the latest situation.

Conversation establishment degree calculation section 320 outputs the calculated degree of establishment of a conversation to conversation partner identifying section 170. Hereinafter, in step S160, conversation partner identifying section 170 judges the conversation partner in the same way as in Embodiment 1. Furthermore, in step S170, output control section 180 controls the output sound.

As described above, the present embodiment adopts a configuration in which identification parameter extraction section 310 includes laughter detection section 311. Laughter detection section 311 detects laughter and conversation establishment degree judging section 320 evaluates the degree of establishment of a conversation focused on a laughter overlap. Thus, the present embodiment can correctly calculate the degree of establishment of a conversation, thereby correctly detect that a conversation is established and correctly judge the conversation partner.

Speech detection section 140 and laughter detection section 311 have been described above as having different configurations, but a speech laughter detection section that separates an input signal into three portions of utterance, laughter and silence may also be provided.

Embodiment 3

The present embodiment calculates a degree of establishment of a conversation by focusing attention on an utterance ratio of a speaker. Before describing a specific configuration and operation of the present embodiment, the reason that the present inventor et al. focused attention on the utterance ratio of the speaker will be described first.

In the prior art, when one speaker is talking and the other speaker remains silent, points are added to the degree of establishment of a conversation, and therefore even when a person unilaterally continues to speak, this is regarded as a case where a conversation is established. The conventional method may be used to detect a conversation partner in a scene like a conference in which a conversation is in progress. However, in a situation in which the user wears a wearable microphone such as a hearing aid all the time, there are many cases where the user talks to himself/herself or a third party's voice who is not conversing with the user continues to be inputted to the microphone, and the conventional method lacks practicality. The present embodiment solves such a problem.

The present embodiment detects that one of the user and conversation partner is unilaterally talking and reduces the degree of establishment of a conversation when "unilateral talk" is detected. As a method of detecting "unilateral talk," the present embodiment calculates an utterance section ratio between the user and conversation partner and judges this case where the utterance section ratio is extremely biased as "unilateral talk."

Here, utterance section ratio $Rb_{1,k}$ between sound signal S1 and sound signal Sk (k: direction, k=2, 3, ..., 8) is defined by equation 6 below.

(Equation 6)

Utterance section ratio $Rb_{1,k}$=(sum of durations of utterance sections of S1 for past $N$ seconds)/(sum of durations of utterance sections of S1 for past $N$ seconds+sum of durations of utterance sections of Sk for past $N$ seconds)  [6]

To analyze how often one speaker continues to talk unilaterally in an actual daily conversation, the present inventor et al. calculated the above described utterance section ratio from nine sets of conversation data recording daily conversations by changing the length of a time window (time window width).

Figure 16:
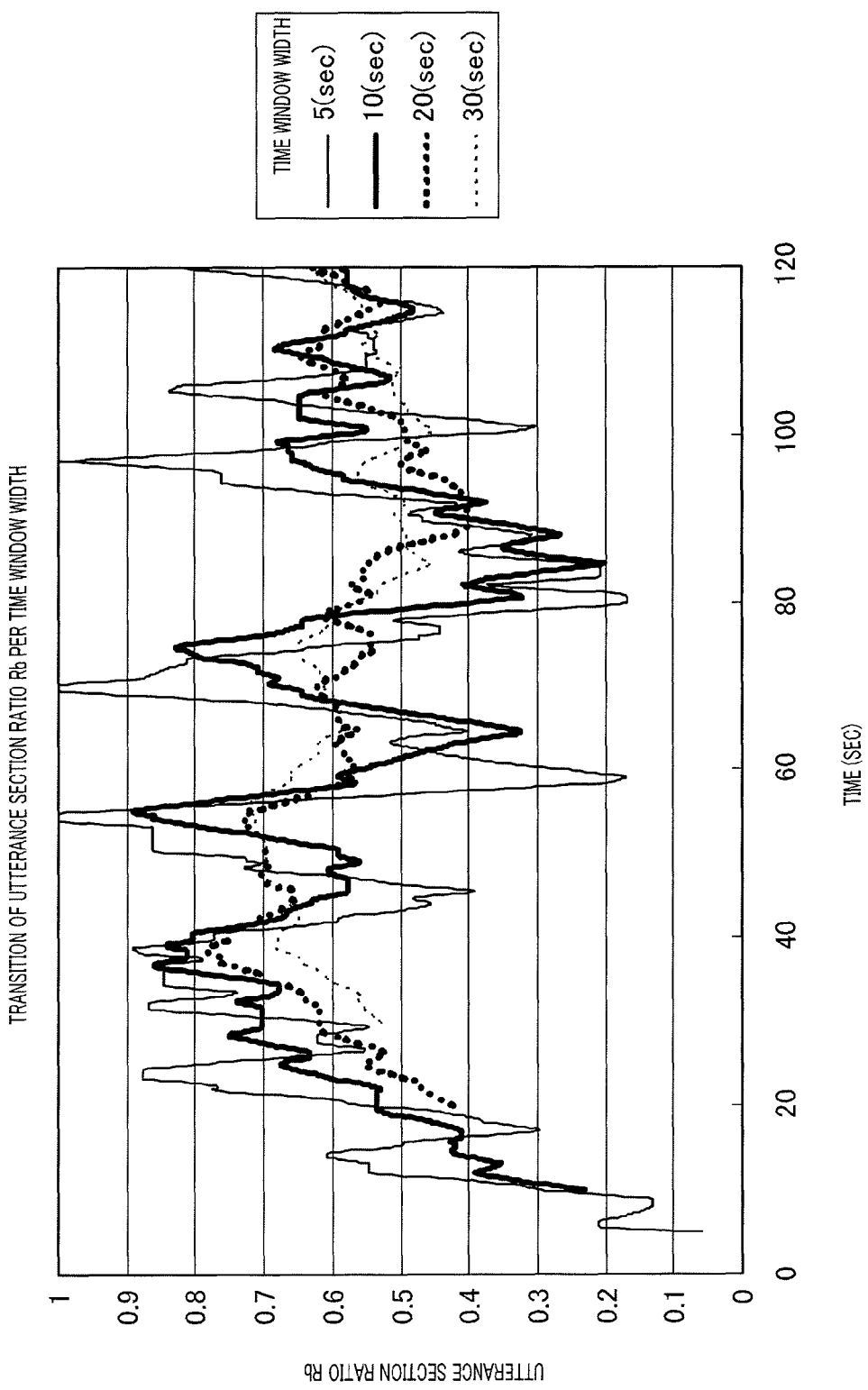
FIG. 16 is a diagram illustrating an example of transition of utterance section ratio Rb per time window width of a certain set of conversations.

FIG. 16 is a graph showing an example of transition of utterance section ratio Rb per time window width of a certain one set of conversations. The horizontal axis shows an elapsed time after the start of a conversation and the vertical axis shows an utterance section ratio. Time window width N is shown in cases of 5 sec, 10 sec, 20 sec and 30 sec. As a result, the present inventor et al. noticed that in the case of the time window on the order of N=10 sec, the utterance section ratio between two speakers changes with an elapsed time, but falls within a range of roughly 10% to 90% for any conversation.

Thus, the present embodiment multiplies the degree of establishment of a conversation by a weight of less than 1 according to the value of the utterance section ratio for past N seconds and thereby suppresses unilateral talk.

Hereinafter, an internal configuration of the signal processing apparatus according to the present embodiment will be described. As in the case of Embodiment 1, the present embodiment is an example where the present invention is applied to a remote control type hearing aid. Since the shape of the remote control type hearing aid is similar to that in FIG. 5, descriptions thereof will be omitted.

Figure 17:
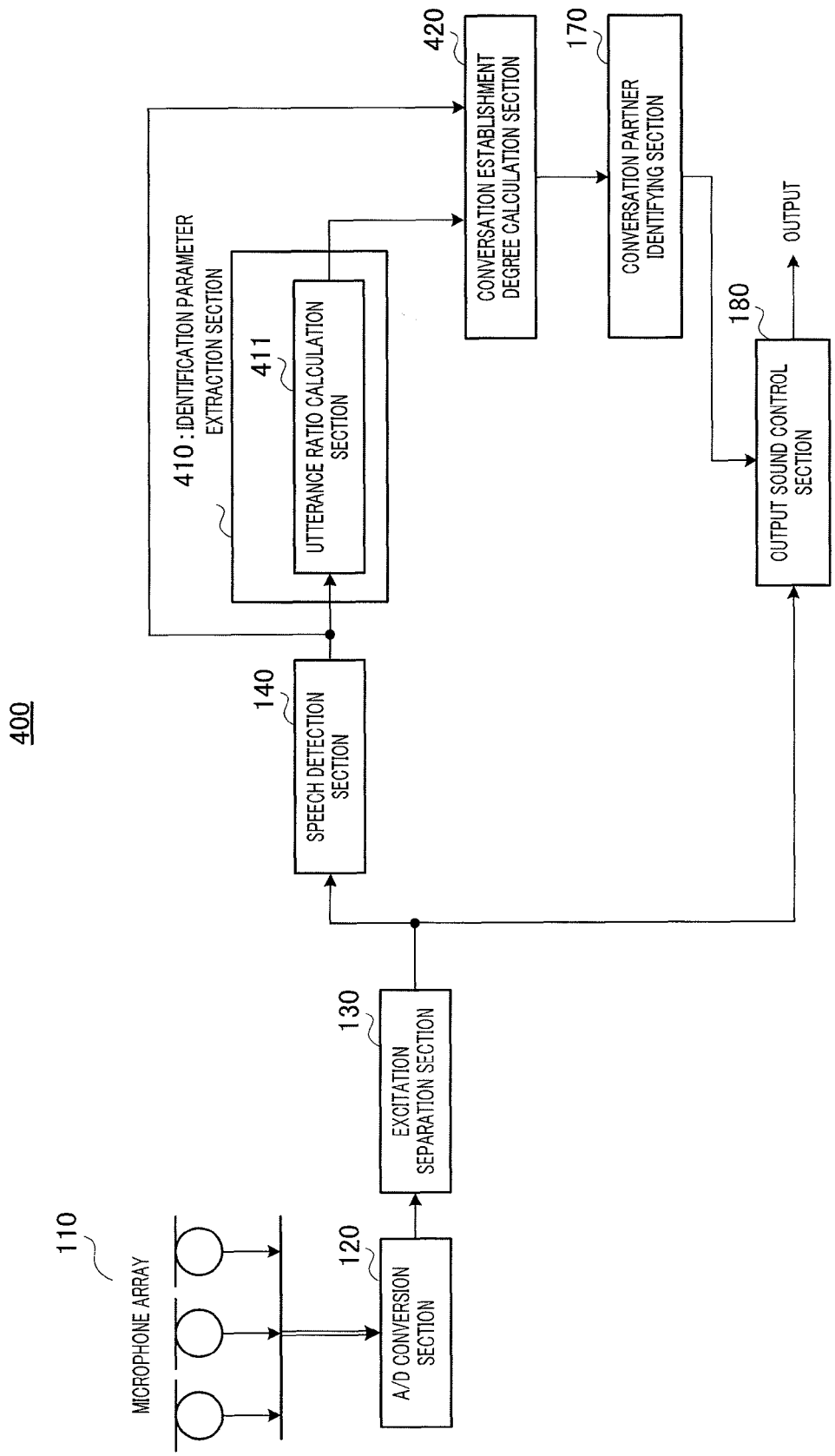
FIG. 17 is a block diagram illustrating main components of a signal processing apparatus according to Embodiment 3 of the present invention.

FIG. 17 is a block diagram showing main components of signal processing apparatus 400 according to the present embodiment. In signal processing apparatus 400 in FIG. 17, components common to those of signal processing apparatus 100 in FIG. 4 will be assigned the same reference numerals as those in FIG. 4 and descriptions thereof will be omitted. Signal processing apparatus 400 in FIG. 17 is provided with identification parameter extraction section 410 and conversation establishment degree calculation section 420 instead of identification parameter extraction section 150 and conversation establishment degree calculation section 160 of signal processing apparatus 100 in FIG. 4.

Identification parameter extraction section 410 includes utterance ratio calculation section 411.

Utterance ratio calculation section 411 calculates an utterance section ratio from speech section information calculated by speech detection section 140 as utterance ratio information.

Conversation establishment degree calculation section 420 calculates a degree of establishment of a conversation from the speech section information calculated by speech detection section 140 and the utterance section ratio calculated by utterance ratio calculation section 411. The method of calculating the degree of establishment of a conversation by conversation establishment degree calculation section 420 will be described later.

Figure 18:
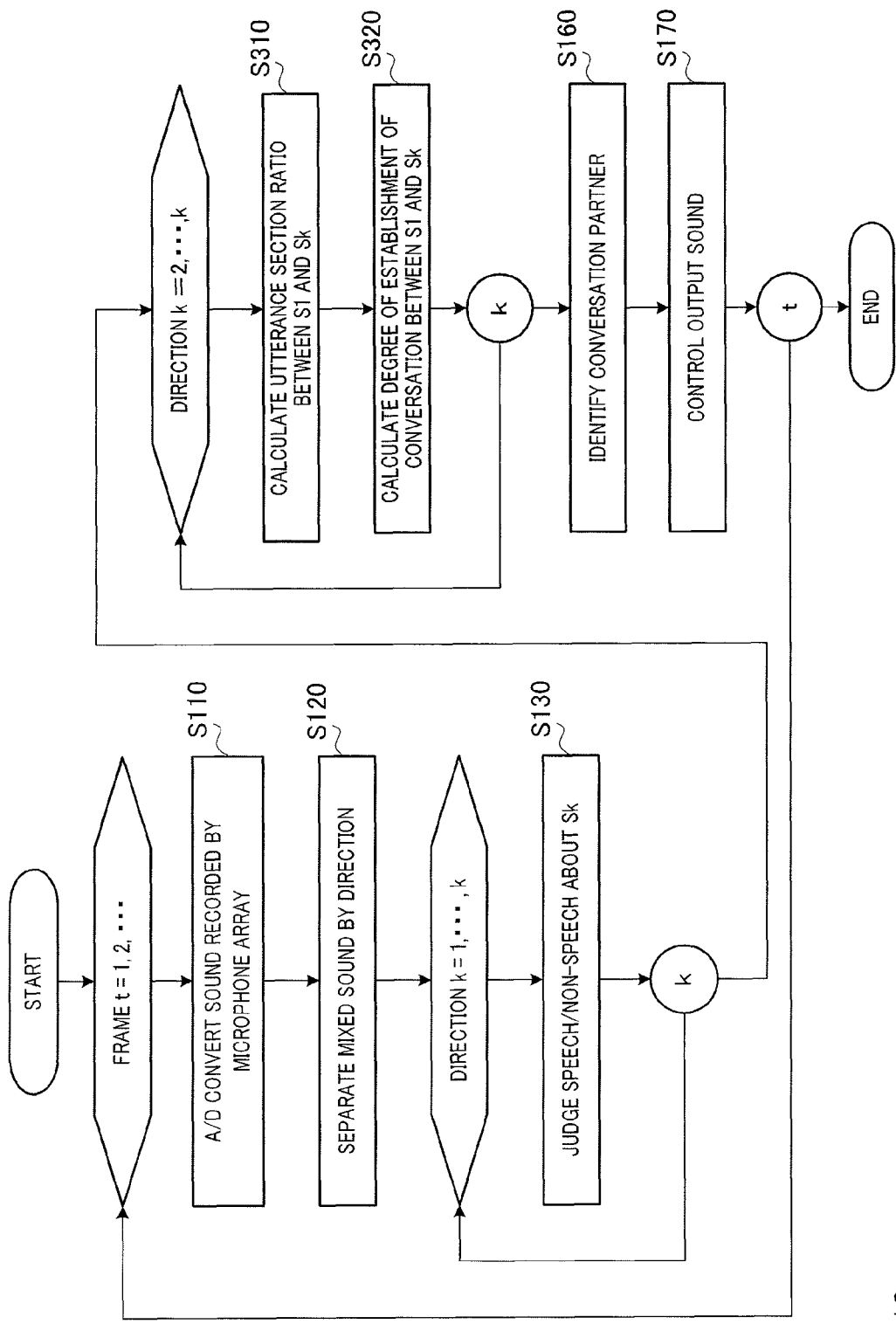
FIG. 18 is a flowchart illustrating operations of a hearing aid according to Embodiment 3.

FIG. 18 is a flowchart showing operations of hearing aid 200 mounted with signal processing apparatus 400 according to the present embodiment. Operations of hearing aid 200 will be described using the flowchart in FIG. 18. In FIG. 18, steps common to FIG. 7 will be assigned the same reference numerals as those in FIG. 7 and descriptions thereof will be omitted.

In steps S110, S120 and S130, sound recording and A/D conversion, separation and speech detection are performed respectively in the same way as in Embodiment 1.

In the present embodiment as in the case of Embodiment 1, speech detection section 140 defines a section judged as speech as an utterance section.

Next, processing in step S310 and step S320 is performed on a combination of front sound signal S1 and sound signal Sk (direction k=2, 3, ..., 8) in seven directions other than the front direction.

In step S310, utterance ratio calculation section 411 calculates utterance section ratio $Rb_{1,k}$ between sound signal S1 and sound signal Sk in a section of past N seconds (N=10) from frame t and outputs the utterance section ratio to conversation establishment degree calculation section 420.

Next, in step S320, conversation establishment degree calculation section 420 calculates a degree of establishment of a conversation between sound signal S1 and sound signal Sk. In the present embodiment, conversation establishment degree calculation section 420 calculates degree of establishment of a conversation $C_{1,k}(t)$ in frame t as shown, for example, in equation 7.

(Equation 7)

$$C_{1,k}(t) = SC_{1,k}(t)/t \times w(Rb_{1,k})$$ [7]

$$w(Rb_{1,k}) = 10Rb_{1,k} \quad (Rb_{1,k} < 0.1)$$
$$= 1 \quad (0.1 \le Rb_{1,k} < 0.9)$$
$$= 10 - 10Rb_{1,k} \quad (Rb_{1,k} \ge 0.9)$$

when $t = 0$
$SC_{1,k}(t) = 0$
when $t > 0$
$SC_{1,k}(t) = SC_{1,k}(t-1) - K_{11}$
(when S1 is utterance and Sk is utternace in frame $t$) =
$$SC_{1,k}(t-1) - K_{00}$$
(when S1 is silence and Sk is silence in frame $t$) =
$$SC_{1,k}(t-1) + K_{01}$$
(when S1 is utterance and Sk is silence in frame $t$) =
$$SC_{1,k}(t-1) + K_{01}$$
(when S1 is silence and Sk is utternace in frame $t$)
where, it is assumed that $0 \le K_{00}, 0 \le K_{01}, 0 \le K_{11}$.

By this means, when the utterance section ratio is biased to less than 10% or equal to or higher than 90%, the present embodiment multiplies the utterance section ratio by a weight of less than 1, and can thereby suppress unilateral talk. N=10 and weight w ($Rb_{1,k}$) are designed as shown in the above equation this time, but the design is not limited to this.

Conversation establishment degree calculation section 420 outputs the calculated degree of establishment of a conversation to conversation partner identifying section 170. Hereinafter, in step S160, conversation partner identifying section 170 judges a conversation partner in the same way as in Embodiment 1. Furthermore, in step S170, output control section 180 controls the output sound.

As described above, the present embodiment adopts a configuration in which identification parameter extraction section 410 includes utterance ratio calculation section 411. Utterance ratio calculation section 411 calculates an utterance section ratio from the speech section information as utterance ratio information and conversation establishment degree calculation section 420 calculates the degree of establishment of a conversation using the speech section information and utterance ratio information. To be more specific, when the utterance section ratio between the user and the other partner is extremely biased, utterance ratio calculation section 411 sets utterance section ratio $Rb_{1,k}$ so that the degree of establishment of a conversation is lowered. Next, conversation establishment degree calculation section 420 calculates the degree of establishment of a conversation using utterance section ratio $Rb_{1,k}$. This prevents a device like a hearing aid which is daily worn from malfunctioning when the user talks to himself/herself or due to a third party's voice when the user is not in conversation, making it possible to correctly detect that a conversation is established and correctly judge the conversation partner.

Embodiment 4

The present embodiment will calculate a degree of establishment of a conversation by focusing attention on an utterance overlap or silence duration, laughter overlap and utterance ratio of a speaker.

Hereinafter, the internal configuration of a signal processing apparatus according to the present embodiment will be described. As in the case of Embodiment 1, the present embodiment is an example where the present invention is applied to a remote control type hearing aid. Since the shape of the remote control type hearing aid is similar to that in FIG. 5, descriptions thereof will be omitted.

Figure 19:
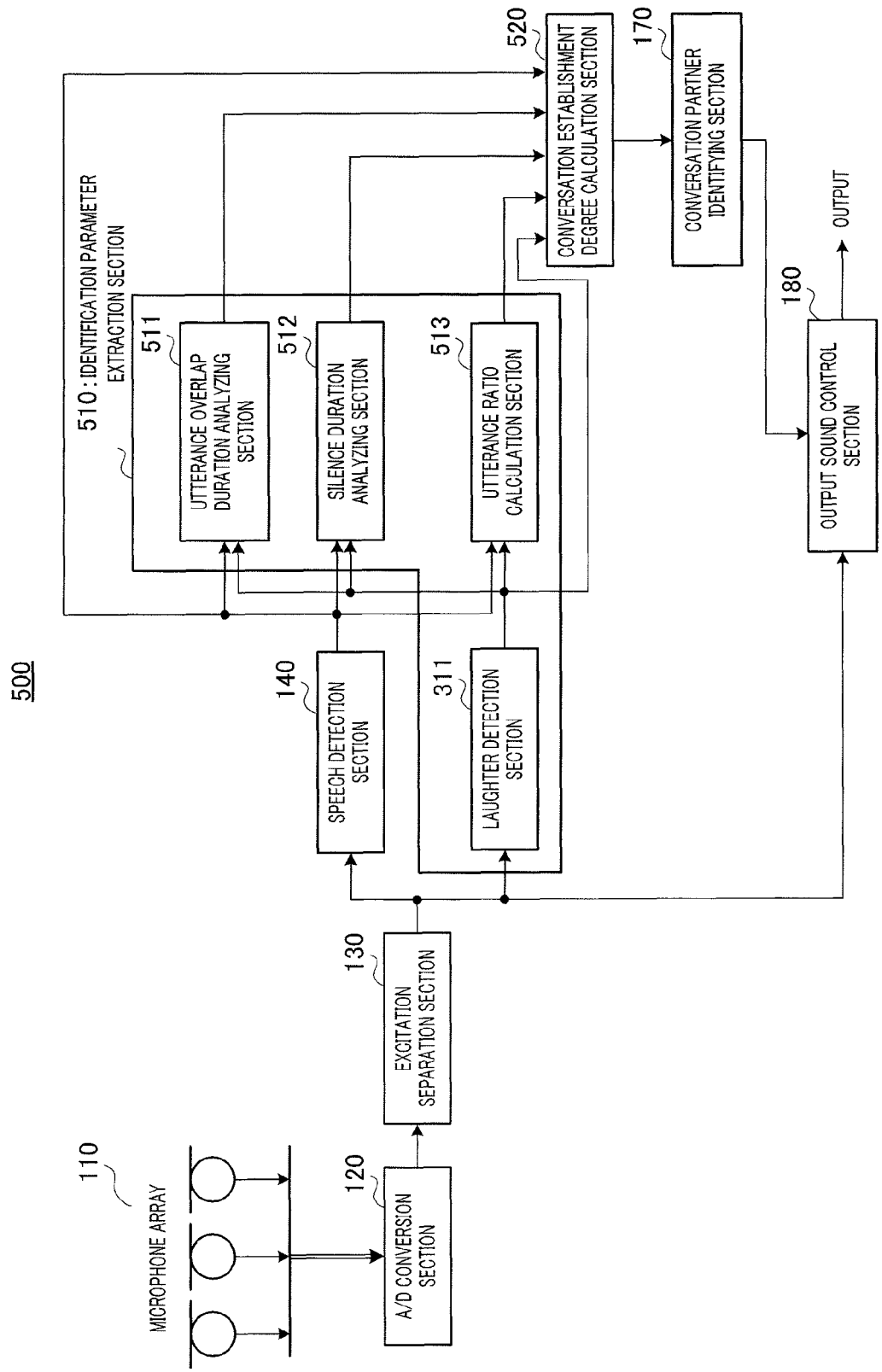
FIG. 19 is a block diagram illustrating main components of a signal processing apparatus according to Embodiment 4 of the present invention.

FIG. 19 is a block diagram showing main components of signal processing apparatus 500 according to the present embodiment. In signal processing apparatus 500 in FIG. 19, components common to those in signal processing apparatuses 100, 300 and 400 in FIG. 4, FIG. 13 and FIG. 17 will be assigned the same reference numerals as those in these figures and descriptions thereof will be omitted. Signal processing apparatus 500 in FIG. 19 is provided with identification parameter extraction section 510 and conversation establishment degree calculation section 520 instead of identification parameter extraction section 150 and conversation establishment degree calculation section 160 of signal processing apparatus 100 in FIG. 4.

Identification parameter extraction section 510 includes utterance overlap duration analyzing section 511, silence duration analyzing section 512, laughter detection section 311 and utterance ratio calculation section 513.

In the present embodiment, laughter section information obtained by laughter detection section 311 is also outputted to utterance overlap duration analyzing section 511, silence duration analyzing section 512 and utterance ratio calculation section 513. Utterance overlap duration analyzing section 511, silence duration analyzing section 512 and utterance ratio calculation section 513 use the laughter section information for utterance overlap duration analysis, silence duration analysis and calculation of an utterance ratio together with speech section information from speech detection section 140. The present embodiment is different in this point from utterance overlap duration analyzing section 151, silence duration analyzing section 152 and utterance ratio calculation section 411 according to Embodiment 1 and Embodiment 3.

Figure 20:
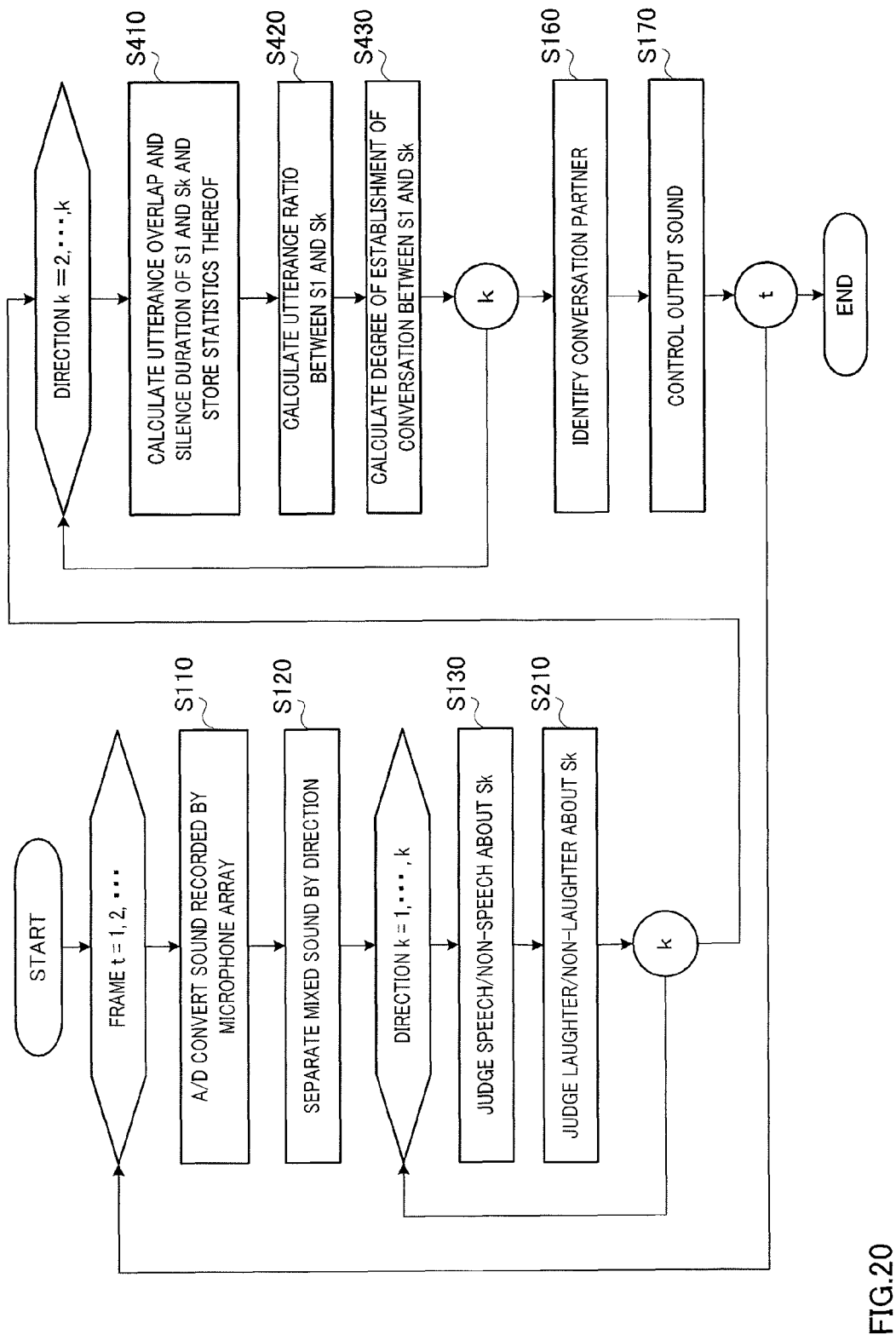
FIG. 20 is a flowchart illustrating operations of a hearing aid according to Embodiment 4.

FIG. 20 is a flowchart showing operations of hearing aid 200 mounted with signal processing apparatus 500 according to the present embodiment. Operations of hearing aid 200 will be described using the flowchart in FIG. 20. In FIG. 20, steps common to those in FIG. 14 will be assigned the same reference numerals in FIG. 14 and descriptions thereof will be omitted.

In steps S110, S120, S130 and S210, as in the case of Embodiment 2, sound recording and A/D conversion, separation, speech detection and laughter/non-laughter judgment are performed respectively.

Next, processing in steps S410, S420 and S430 will be performed on combinations of front sound signal S1 and sound signal Sk (direction k=2, 3, . . . , 8) in seven direction other than the front direction.

Here, as in the case of Embodiment 2, the present embodiment defines "utterance," "silence" and "laughter" as follows.

"Utterance": A frame whose speech detection result is speech and laughter detection result is non-laughter.

"Silence": A frame whose speech detection result is non-speech and laughter detection result is non-laughter.

"Laughter": A frame whose laughter detection result is laughter regardless of the speech detection result.

In step S410, utterance overlap duration analyzing section 511 calculates and analyzes the duration of overlapping of the utterance section not including laughter between sound signal S1 and sound signal Sk based on the classification of utterance/laughter/silence. Furthermore, silence duration analyzing section 512 calculates and analyzes the duration of the silence section not including laughter based on the classification of utterance/laughter/silence.

Next, in step S420, utterance ratio calculation section 513 calculates the ratio of the utterance section of sound signal S1 and sound signal Sk without including laughter.

Next, in step S430, conversation establishment degree calculation section 520 calculates the degree of establishment of a conversation between sound signal S1 and sound signal Sk. In the present embodiment, conversation establishment degree calculation section 520 calculates degree of establishment of conversation $C_{1,k}(t)$ in frame t, for example, as shown in equation 8.

(Equation 8)

$$C_{1,k}(t) = \{SC_{1,k}(t)/t + w1 \cdot Pc(t) + w2 \cdot Ps(t)\} \times w(Rb_{1,k}) \quad [8]$$

$$w(Rb_{1,k}) = 10Rb_{1,k} \quad (Rb_{1,k} < 0.1)$$
$$= 1 \quad (0.1 \le Rb_{1,k} < 0.9)$$
$$= 1 - 10Rb_{1,k} \quad (Rb_{1,k} \ge 0.9)$$

when $t = 0$
$SC_{1,k}(t) = 0$
when $t > 0$
$SC_{1,k}(t) = SC_{1,k}(t-1) - K_{11}$
(when S1 is utterance and Sk is utternace in frame $t$) =
$$SC_{1,k}(t-1) - K_{12}$$
(when S1 is utterance and Sk is laughter in frame $t$) =
$$SC_{1,k}(t-1) + K_{01}$$
(when S1 is utterance and Sk is silence in frame $t$) =
$$SC_{1,k}(t-1) - K_{12}$$
(when S1 is laughter and Sk is utternace in frame $t$) =
$$SC_{1,k}(t-1) + K_{22}$$
(when S1 is laughter and Sk is laughter in frame $t$) = $SC_{1,k}(t-1)$
(when S1 is laughter and Sk is silence in frame $t$) =
$$SC_{1,k}(t-1) + K_{01}$$
(when S1 is silence and Sk is utternace in frame $t$) = $SC_{1,k}(t-1)$
(when S1 is silence and Sk is laughter in frame $t$) =
$$SC_{1,k}(t-1) - K_{10}$$
(when S1 is silence and Sk is silence in frame $t$)
where, it is assumed that $0 \le K_{12} \le K_{11} \le K_{22}, 0 \le K_{00}$.

Conversation establishment degree calculation section 520 then outputs the calculated degree of establishment of a conversation to conversation partner identifying section 170. Hereinafter, in step S160, conversation partner identifying section 170 judges the conversation partner in the same way as in Embodiment 1. In step S170, output control section 180 controls the output sound.

As described above, identification parameter extraction section 510 adopts a configuration including utterance overlap duration analyzing section 511, silence duration analyzing section 512 and laughter detection section 311. Conversation establishment degree calculation section 520 calculates a degree of establishment of a conversation using utterance overlap duration, silence duration, laughter section information indicating the laughter section or utterance ratio information indicating the ratio of length of the utterance section. For this reason, the present embodiment can evaluate the degree of establishment of a conversation using features of crosstalk specific to daily conversation or appearance of laughter, and can also correctly calculate the degree of establishment of a conversation of informal daily conversation. Thus, the present embodiment can correctly detect that a conversation is established and correctly judge the conversation partner.

Especially in the present embodiment, utterance overlap duration analyzing section 511 and silence duration analyzing section 512 calculate the utterance overlap duration and silence duration by taking laughter section information into consideration. Thus, the present embodiment can accurately extract the utterance section not including laughter, and thereby correctly calculate durations of the utterance overlap and silence section and calculate the degree of establishment of a conversation more correctly.

Furthermore, the present embodiment provides utterance ratio calculation section 513 for identification parameter extraction section 510, and can thereby suppress unilateral talk. This prevents a device like a hearing aid which is daily worn from malfunctioning when the user talks to himself/herself or due to a third party's voice when the user is not in conversation.

Although a case has been assumed and described in Embodiment 1 to Embodiment 4 where the present invention is applied to a control type hearing aid, the present invention is also applicable to a hearing aid using a wearable microphone such as a behind the ear type or canal aid type. Unlike the remote control type hearing aid, it is difficult for the wearable microphone to orient a defined direction of the microphone array toward the user to thereby separate and record the user's voice. Therefore, the present invention is applicable to the method disclosed in patent literature 4 where a bone conduction microphone is attached to a hearing aid to detect cranial vibration caused by the voice uttered by the user and thereby detect the user's voice. Alternatively, by applying the present invention to a method of detecting speech from the mouse of the user using a headset microphone, it is possible to detect the voice uttered by the user. Furthermore, the present embodiment may also be adapted such that no excitation separation section is provided and it is judged at short time intervals whether or not there is any voice uttered by the user and whether or not sounds other than the user's voice are speech so as to calculate the degree of establishment of a conversation between the user and other speakers.

Furthermore, as application to other applications, the present invention is applicable to a speech recorder, digital still camera, movie, conference call system or the like. A digital recording device such as speech recorder, digital still camera, movie can perform recording while suppressing jamming sound such as conversations of people other than conversations to be recorded. Alternatively, the present invention may be adapted so as to record all input sounds collected by the microphone array, extract a combination of conversations whose degree of establishment of a conversation increases later and reproduce a desired conversation.

Furthermore, in a conference call system, when there is a jamming sound at one transmitting site from another conference held near the site, a voice of the conversation partner transmitted from the other noiseless transmitting site may be extracted and other voice may be suppressed, and it is thereby possible to smoothly proceed with the conference. Furthermore, when jamming sounds exist at both sites, for example, a loudest voice inputted to the microphone maybe detected, the conversation partner thereof may be detected and other voice may be suppressed, and it is thereby possible to obtain similar effects.

The disclosure of Japanese Patent Application No. 2010-039698, filed on Feb. 25, 2010, including the specification, drawings and abstract, is incorporated herein by reference in its entirety.

INDUSTRIAL APPLICABILITY

The signal processing apparatus and signal processing method according to the present invention are suitable for use as a signal processing apparatus in various fields such as hearing aid, speech recorder, digital still camera, movie, conference call system.

REFERENCE SIGNS LIST

100, 300, 400, 500 Signal processing apparatus
110, 220 Microphone array
120, 230 A/D conversion section
130 Excitation separation section
140 Speech detection section
150, 310, 410, 510 Identification parameter extraction section
151, 511 Utterance overlap duration analyzing section
152, 512 Silence duration analyzing section
160, 320, 420, 520 Conversation establishment degree calculation section
170 Conversation partner identifying section
180 Output sound control section
200 Hearing aid
210 Hearing aid body
240 CPU
250 Memory
260 Earphone
311 Laughter detection section
411, 513 Utterance ratio calculation section

The invention claimed is:

1. A signal processing apparatus comprising:
a separation section that separates a mixed sound signal in which a plurality of excitations are mixed into the respective excitations;
a speech detection section that performs speech detection on the plurality of separated excitation signals, judges whether or not the plurality of excitation signals are speech and generates speech section information indicating speech/non-speech information for each excitation signal;
at least one of an utterance overlap duration extraction section that calculates and analyzes an utterance overlap duration using the speech section information and a silence duration extraction section that calculates and analyzes a silence duration; and
a conversation establishment degree calculation section that calculates a degree of establishment of a conversation indicating the degree of establishment of a conversation based on the extracted utterance overlap duration or the silence duration.

2. The signal processing apparatus according to claim 1, further comprising, instead of the utterance overlap duration extraction section or the silence duration extraction section, a laughter detection section that performs laughter detection on the plurality of separated excitation signals and extracts laughter section information as the identification parameter,
wherein the conversation establishment degree calculation section calculates the degree of establishment of a conversation using the speech section information and the laughter section information for combinations of the plurality of excitation signals.

3. The signal processing apparatus according to claim 1, further comprising, instead of the utterance overlap duration extraction section or the silence duration extraction section, an utterance ratio calculation section that extracts utterance ratio information as the identification parameter for combinations of the plurality of excitation signals,
wherein the conversation establishment degree calculation section calculates the degree of establishment of a conversation using the speech section information and the utterance ratio information.

4. The signal processing apparatus according to claim 1, wherein the extraction section extracts the ratio of the utterance overlap duration and the silence duration of at least one of the utterance overlap duration analyzing section and the silence duration analyzing section as the identification parameter.

5. The signal processing apparatus according to claim 1, wherein the extraction section extracts an average value of the utterance overlap duration or the silence duration of at least one of the utterance overlap duration analyzing section and the silence duration analyzing section as the identification parameter.

6. The signal processing apparatus according to claim 2, wherein the conversation establishment degree calculation section increases the degree of establishment of a conversation when laughter is detected simultaneously by the plurality of excitation signals.

7. The signal processing apparatus according to claim 2, wherein when a first excitation signal of the plurality of excitation signals detects laughter and a second excitation signal does not detect laughter, the conversation establishment degree calculation section does not change the degree of establishment of a conversation between the first excitation signal and the second excitation signal or lowers the degree of establishment of a conversation.

8. The signal processing apparatus according to claim 3, wherein the utterance ratio calculation section assumes an utterance section ratio between the first excitation signal and the second excitation signal of the plurality of excitation signals within a predetermined past time window as the utterance ratio information.

9. A signal processing apparatus comprising:
a microphone array in which a plurality of microphones are arranged;
an A/D conversion section that converts an analog domain mixed sound signal inputted from the microphone array to a digital domain signal;
the signal processing apparatus according to claim 1 that receives the digital domain mixed sound signal as input; and
an output sound control section that processes and outputs the digital domain mixed sound signal according to the degree of establishment of a conversation.

10. The signal processing apparatus according to claim 9, wherein the output sound control section processes and outputs the digital domain mixed sound signal through directional control.

\* \* \* \* \*